US010417317B2

(12) United States Patent
Myers

(10) Patent No.: US 10,417,317 B2
(45) Date of Patent: Sep. 17, 2019

(54) WEB PAGE PROFILER

(71) Applicant: ADP, LLC, Roseland, NJ (US)

(72) Inventor: Clint Myers, Suwanee, GA (US)

(73) Assignee: ADP, LLC, Roseland, NJ (US)

( * ) Notice: Subject to any disclaimer, the term of this patent is extended or adjusted under 35 U.S.C. 154(b) by 18 days.

(21) Appl. No.: 14/943,951

(22) Filed: Nov. 17, 2015

(65) Prior Publication Data

US 2017/0031882 A1 Feb. 2, 2017

Related U.S. Application Data

(63) Continuation-in-part of application No. 14/809,686, filed on Jul. 27, 2015.

(60) Provisional application No. 62/217,191, filed on Sep. 11, 2015.

(51) Int. Cl.
*G06F 17/22* (2006.01)
*H04L 29/08* (2006.01)
*H04L 29/06* (2006.01)

(52) U.S. Cl.
CPC .......... *G06F 17/2247* (2013.01); *H04L 67/02* (2013.01); *H04L 67/306* (2013.01); *H04L 67/42* (2013.01)

(58) Field of Classification Search
CPC .................................................. G06F 17/2247
See application file for complete search history.

(56) References Cited

U.S. PATENT DOCUMENTS

| | | | |
|---|---|---|---|
| 5,821,937 A | 10/1998 | Tonelli et al. | |
| 6,035,119 A | 3/2000 | Massena et al. | |
| 6,151,624 A | 11/2000 | Teare et al. | |
| 6,336,138 B1 | 1/2002 | Caswell et al. | |
| 6,606,744 B1 | 8/2003 | Mikurak | |
| 6,629,081 B1 | 9/2003 | Cornelius et al. | |

(Continued)

FOREIGN PATENT DOCUMENTS

| | | |
|---|---|---|
| WO | 2007076459 A2 | 7/2007 |
| WO | 2013078041 A1 | 5/2013 |
| WO | 2013137982 A1 | 9/2013 |

OTHER PUBLICATIONS

Dennis Moth, "HTML UI Responsiveness tool in Visual Studio 2013" found at https://blogs.msdn.microsoft.com/devops/2013/07/16/html-ui-responsiveness-tool-in-visual-studio-2013/, Jul. 16, 2013, Microsoft DevOps Blog, pp. 1-13.*

(Continued)

*Primary Examiner* — Scott T Baderman
*Assistant Examiner* — Seung Woon Jung
(74) *Attorney, Agent, or Firm* — Yee & Associates, P.C.

(57) ABSTRACT

A method, computer system and computer program product for profiling a web page. Components in the web page are identified. Times to display the components for the web page in a browser in a graphical user interface on a display system for a client data processing system are identified while the components are processed for display on the display system during use of the application by a customer. A profile of the times is created to display a group of the components on the display system when a user input from the customer requests information about the times to display the group of the components, enabling identifying a corrective action that increases a speed at which the web page is displayed on the display system for the client data processing system.

29 Claims, 19 Drawing Sheets

(56) References Cited

U.S. PATENT DOCUMENTS

| | | | |
|---|---|---|---|
| 6,883,142 | B2 | 4/2005 | Shimamoto et al. |
| 7,013,289 | B2 | 3/2006 | Horn et al. |
| 7,162,687 | B2 | 1/2007 | Pelegri-Llopart et al. |
| 7,165,041 | B1 | 1/2007 | Guheen et al. |
| 7,536,641 | B2 | 5/2009 | Rosenstein et al. |
| 7,644,107 | B2 | 1/2010 | Neagovici-Negoescu et al. |
| 7,831,693 | B2 | 11/2010 | Lai |
| 7,853,884 | B2 | 12/2010 | Olander et al. |
| 7,917,846 | B2 | 3/2011 | Decker et al. |
| 8,171,415 | B2 | 5/2012 | Appleyard et al. |
| 8,326,889 | B2 | 12/2012 | Kaisermayr |
| 8,346,929 | B1 | 1/2013 | Lai |
| 8,370,420 | B1 | 2/2013 | Decasper et al. |
| 8,554,630 | B2 | 10/2013 | Grant et al. |
| 8,775,321 | B1 | 7/2014 | Mooneyham |
| 8,775,923 | B1 | 7/2014 | Kroeger et al. |
| 8,838,555 | B2 | 9/2014 | Von Kaenel et al. |
| 8,868,533 | B2 | 10/2014 | Powell et al. |
| 9,699,142 | B1 * | 7/2017 | Allen .................. H04L 63/1433 |
| 2002/0099738 | A1 | 7/2002 | Grant |
| 2003/0033179 | A1 | 2/2003 | Katz et al. |
| 2006/0248442 | A1 | 11/2006 | Rosenstein et al. |
| 2007/0156726 | A1 | 7/2007 | Levy |
| 2007/0180364 | A1 | 8/2007 | Kobayashi |
| 2007/0192352 | A1 | 8/2007 | Levy |
| 2007/0208711 | A1 | 9/2007 | Rhoads et al. |
| 2008/0139191 | A1 | 6/2008 | Melnyk et al. |
| 2009/0292984 | A1 | 11/2009 | Bauchot et al. |
| 2009/0313579 | A1 | 12/2009 | Poulson |
| 2010/0070448 | A1 | 3/2010 | Omoigui |
| 2010/0146112 | A1 | 6/2010 | Shacham et al. |
| 2010/0174774 | A1 | 7/2010 | Kern et al. |
| 2010/0241518 | A1 | 9/2010 | McCann |
| 2010/0251126 | A1 | 9/2010 | Krishnamurthy |
| 2010/0262780 | A1 | 10/2010 | Mahan et al. |
| 2010/0268694 | A1 | 10/2010 | Denoue et al. |
| 2010/0306643 | A1 | 12/2010 | Chabot et al. |
| 2010/0313149 | A1 | 12/2010 | Zhang et al. |
| 2011/0055699 | A1 | 3/2011 | Li et al. |
| 2011/0066732 | A1 | 3/2011 | Iwade et al. |
| 2011/0066733 | A1 | 3/2011 | Hashimoto et al. |
| 2011/0110568 | A1 | 5/2011 | Vesper et al. |
| 2011/0252138 | A1 * | 10/2011 | Ahuja .................. G06F 17/3089 709/226 |
| 2011/0258173 | A1 | 10/2011 | Ratiner et al. |
| 2011/0289393 | A1 | 11/2011 | Choi |
| 2012/0054599 | A1 | 3/2012 | Nixon et al. |
| 2012/0159430 | A1 | 6/2012 | Waldbaum et al. |
| 2012/0260157 | A1 | 10/2012 | Zhu et al. |
| 2013/0132466 | A1 | 5/2013 | Miller et al. |
| 2013/0138426 | A1 | 5/2013 | DelRocco et al. |
| 2013/0179774 | A1 | 7/2013 | Wang |
| 2013/0226992 | A1 * | 8/2013 | Bapst ..................... H04L 67/42 709/203 |
| 2013/0275889 | A1 | 10/2013 | O'Brien-Strain et al. |
| 2013/0346873 | A1 | 12/2013 | Vasudev et al. |
| 2014/0195557 | A1 | 7/2014 | Oztaskent et al. |
| 2014/0223306 | A1 | 8/2014 | McIntosh et al. |
| 2014/0304393 | A1 * | 10/2014 | Annamalaisami ...... H04L 43/04 709/224 |
| 2014/0337707 | A1 | 11/2014 | Choi |
| 2015/0193401 | A1 | 7/2015 | Kim |
| 2015/0339268 | A1 | 11/2015 | Bednarz et al. |
| 2015/0378575 | A1 | 12/2015 | Kaplinger et al. |
| 2016/0026611 | A1 | 1/2016 | Liu et al. |
| 2016/0149988 | A1 | 5/2016 | Pang |
| 2017/0031876 | A1 | 2/2017 | Myers et al. |
| 2017/0031877 | A1 | 2/2017 | Myers et al. |
| 2017/0031878 | A1 | 2/2017 | Myers et al. |
| 2017/0124219 | A1 | 5/2017 | Dryfoos et al. |

OTHER PUBLICATIONS

Tideways, Analyze Traces User Documentation found at https://tideways.io/profiler/docs/profiler/analyze-trace, Jun. 19, 2015, Tideways, pp. 1-8.*

Joshua Davies, Using the Chrome web developer tools, Part 4: The Timeline Tab found at http://commandlinefanatic.com/cgi-bin/showarticle.cgi?article=art036, Jan. 31, 2015, Command Line Fanatic blog, pp. 1-14.*

Addy Osmani, Improving Web App Performance With the Chrome DevTools Timeline and Profiles, Dec. 9, 2012, a printed article at AddyOsmani.com, 12 pages (Year: 2012).*

Office Action, dated Jan. 30, 2017, regarding U.S. Appl. No. 14/809,686, 24 pages.

Myers et al., "Web Page Design System," U.S. Appl. No. 14/809,717, filed Jul. 27, 2015, 81 pages.

Myers et al., "Web Page Generation System," U.S. Appl. No. 14/809,780, filed Jul. 27, 2015, 117 pages.

Myers et al., "Web Page Generation System," U.S. Appl. No. 14/809,686, filed Jul. 27, 2015, 77 pages.

Kiciman et al., "Remotely Monitoring Client-Side Web App Performance and Behavior," Microsoft, Microsoft Research, copyright 2015, 7 pages, accessed Nov. 17, 2015. http://research.microsoft.com/en-us/projects/ajaxview/ajaxviewusage.aspx.

Office Action, dated Jun. 30, 2017, regarding U.S. Appl. No. 14/809,717, 29 pages.

Final Office Action, dated Jul. 27, 2017, regarding U.S. Appl. No. 14/809,686, 14 pages.

Final Office Action, dated Nov. 2, 2017, regarding U.S. Appl. No. 14/809,717, 18 pages.

Office Action, dated Jan. 12, 2018, regarding U.S. Appl. No. 14/809,780, 36 pages.

Notice of Allowance, dated Jan. 17, 2019, regarding U.S. Appl. No. 14/809,780, 7 pages.

Osmani, "Improving Web App Performance With the Chrome DevTools Timeline and Profiles," Dec. 9, 2012, 14 pages. https://addyosmani.com/blog/performance-optimisation-with-timeline-profiles/.

Final Office Action, dated Feb. 26, 2019, regarding U.S. Appl. No. 14/809,686, 16 pages.

Final Office Action, dated Aug. 6, 2018, regarding U.S. Appl. No. 14/809,780, 29 pages.

* cited by examiner

WEB PAGE PROFILER

CROSS-REFERENCE TO RELATED APPLICATIONS

This application claims the benefit of U.S. Provisional Patent Application Ser. No. 62/217,191, filed Sep. 11, 2015, and entitled "Web Page Profiler." This application is a continuation-in-part (CIP) of U.S. patent application Ser. No. 14/809,686, filed Jul. 27, 2015, entitled "Web Page Generation System," which is incorporated herein by reference.

This application is also related to U.S. patent application Ser. No. 14/809,717, filed Jul. 27, 2015, entitled "Web Page Design System", and U.S. patent application Ser. No. 14/809,780, filed Jul. 27, 2015, entitled "Web Page Generation System", both of which are incorporated herein by reference.

BACKGROUND INFORMATION

1. Field

The present disclosure relates generally to an improved computer system and, in particular, to a method and apparatus for managing the display of web pages in a computer system. Still more particularly, the present disclosure relates to a method and apparatus for identifying performance issues with web pages displayed in a computer system.

2. Background

The Internet is a global system of interconnected computer networks. Many people use the Internet to obtain information and communicate with each other and with organizations. For example, users may access websites on the World Wide Web. These websites may be established by other users or organizations.

A user may retrieve a web page that is displayed on a data processing system such as a computer, a tablet computer, or a mobile phone. A web page is a file that is typically written in a language that is interpreted by a web browser on a data processing system for display.

A user may encounter a web page that displays more slowly than desired. The user may wish to report that the web page is slow. However, the website administrator may find it more difficult than desired to isolate the problem with the web page.

For example, a slow display of a web page may be caused by different sources. A web page may display slowly because of the response time of the web server, traffic on the path over which the web page is delivered, an issue in the browser used to display the web page, or from other sources.

Currently, tools allow capturing information about the steps that are performed to display a web page using a step-by-step process that steps though the application. However, this type of tool may not provide needed information when the problem is not reproducible.

Therefore, it would be desirable to have a method and apparatus that take into account at least some of the issues discussed above, as well as other possible issues. For example, it would be desirable to have a method and apparatus that overcome a technical problem with identifying why a web page is displayed on a client data processing system more slowly than desired.

SUMMARY

An embodiment of the present disclosure provides a computer system comprising a display system for a client data processing system in the computer system and a profiler located in a web page. The profiler identifies components for an application in the web page; identifies times for the client data processing system to obtain content for the web page, create the components for the application in the web page using metadata and the content without using a markup language, and display the components for the application in the web page in a browser in a graphical user interface on the display system. The metadata describes the web page and defines what the web page looks like without the content for the web page. The profiler also creates a profile of the times to display the components on the display system when a user input from a customer requests information about the times to display the components, enabling identifying a corrective action that increases a speed at which the web page is displayed on the display system for the client data processing system.

Another embodiment of the present disclosure provides a method for profiling a web page. Components in the web page are identified. Times to display the components for the web page in a browser in a graphical user interface on a display system for a client data processing system are identified while the components are processed for display on the display system during use of the application by a customer. A profile of the times is created to display a group of the components on the display system when a user input from the customer requests information about the times to display the group of the components, enabling identifying a corrective action that increases a speed at which the web page is displayed on the display system for the client data processing system.

Yet another embodiment of the present disclosure provides a computer system comprising a profiler. The profiler identifies components in a web page and identifies times to display the components for the web page in a graphical user interface on a display system in a client data processing system while the components are processed for display on the display system during use of the application by a customer. The profiler also creates a profile of the times to display the components on the display system when a user input from the customer requests information about the times to render the components, enabling identifying a corrective action that increases a speed at which the web page is displayed on the display system for the client data processing system.

Still another embodiment of the present disclosure provides a computer program product for profiling a web page. The computer program product comprises a computer readable storage media, and first program code, second program code, and third program code stored on the computer readable storage media. The first program code identifies components in the web page. The second program code identifies times to display the components for the web page in a graphical user interface on a display system in a client data processing system while the components are processed for display on the display system during use of the application by a customer. The third program code creates a profile of the times to display the components on the display system when a user input from the customer requests information about the times to display the components, enabling identifying a corrective action that increases a speed at which the web page is displayed on the display system for the client data processing system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that identifying the performance of a web page in an artificial environment may not provide information needed to identify why the web page did not display as quickly as desired when used by a customer or other user. The illustrative embodiments recognize and take into account that testing the web page at a computer or provider of the web page may not recreate all of the environment that contributes to the time that it takes to display the web page.

For example, the illustrative embodiments recognize and take into account that the processes running on the client data processing system at the time the web page is processed for display, the traffic on the path between the client data processing system and the web page server, the use of resources on the web page server, and other factors contribute to the time for displaying a web page on the client data processing system. The illustrative embodiments also recognize and take into account that testing and displaying the web page on the client data processing system after the web page has displayed more slowly than desired does not always provide the information needed to identify the issue with the performance in displaying the web page. For example, the illustrative embodiments also recognize and take into account that changes in the processes running on the client data processing system and the resources used may be different than when the web page originally loaded more slowly than desired and when the web page is profiled at a later time on the client data processing system.

Thus, the illustrative embodiments provide a method and apparatus for profiling a web page. In the illustrative examples, profiling is a process of measuring one or more parameters while a program code is running. The parameters may include, for example, memory use, rendering time, processor use, a frequency of calls, a duration of calls, or other suitable information. Profiling may be a dynamic program analysis used to identify issues with a program code for an application.

In one illustrative example, the process identifies components in a web page. The process identifies times to display components for the web page in a graphical user interface on a display system in a client data processing system while the components are processed for display on the display system during use of the application by a customer. A profile of the times to display the components on the display system is created when a user input from the customer requests information about the times to display the components. The process enables identifying corrective action that increases a speed at which the web page is displayed on a display system on a client data processing system.

Figure 1:
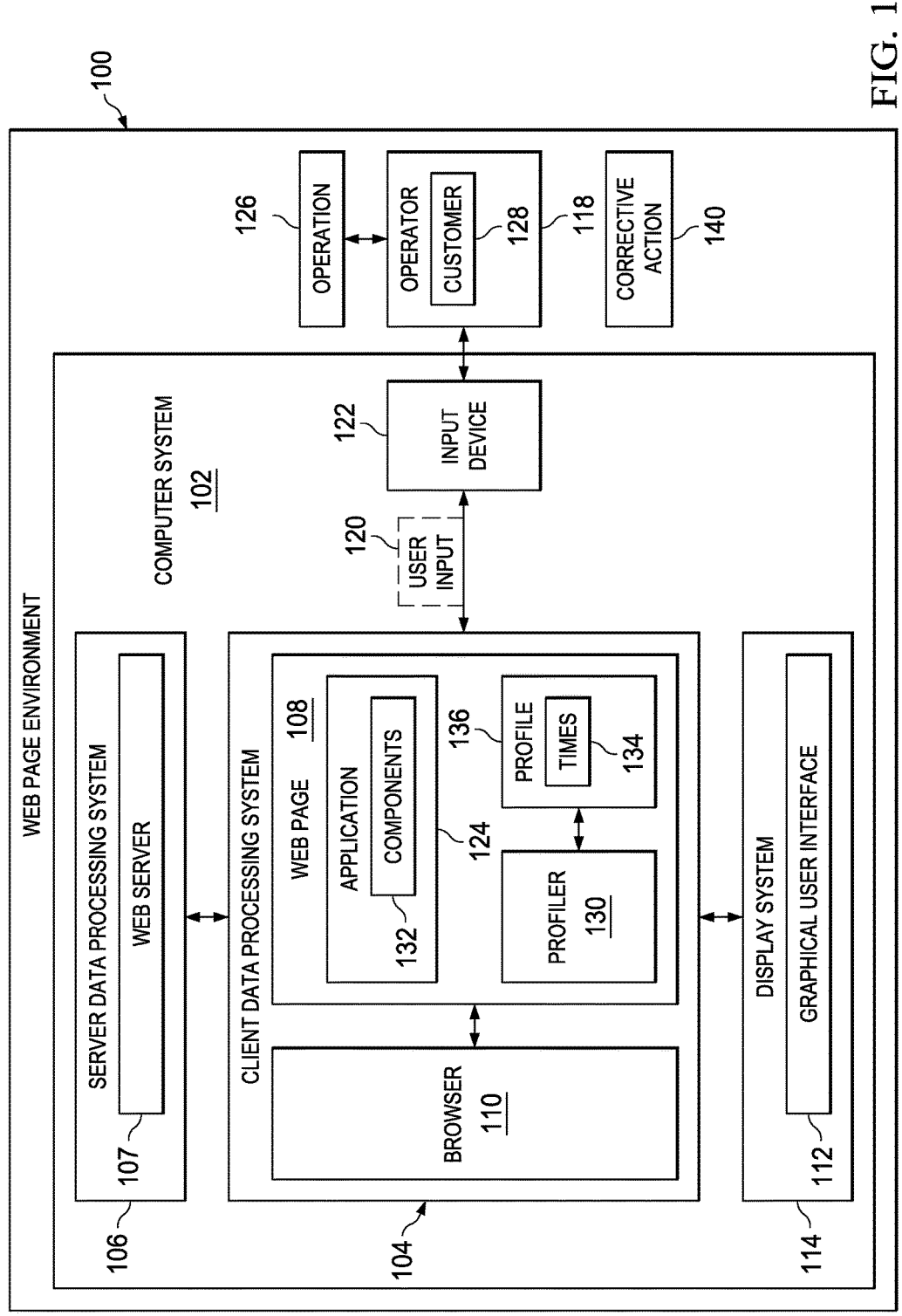
FIG. 1 is an illustration of a block diagram of an application environment in accordance with an illustrative embodiment.

With reference now to the figures and, in particular, with reference to FIG. 1, an illustration of a block diagram of an application environment is depicted in accordance with an illustrative embodiment. In this illustrative example, web page environment 100 includes computer system 102. Computer system 102 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a kiosk, a mobile phone, or some other suitable data processing system.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, computer system 102 includes client data processing system 104 and server data processing system 106. As depicted, web server 107 in server data processing system 106 sends web page 108 to browser 110 in client data processing system 104. Client data processing system 104 processes web page 108 and displays web page 108 in browser 110 in graphical user interface 112 on display system 114 for client data processing system 104.

Display system 114 is a hardware system and includes one or more display devices on which graphical user interface 112 may be displayed. The display devices may include at least one of a light-emitting diode display (LED), a liquid crystal display (LCD), an organic light-emitting diode display (OLED), or some other suitable device on which graphical user interface 112 can be displayed.

In this illustrative example, operator 118 is a person that may interact with web page 108 in graphical user interface 112 through user input 120 generated by input device 122 in client data processing system 104. Input device 122 may be, for example, a mouse, a keyboard, a trackball, a touchscreen, a stylus, or some other suitable type of input device.

As depicted, web page 108 includes application 124. Application 124 is one or more computer programs used to perform a group of functions, tasks, activities, or other operations. The "programs" may be implemented using scripts or other programming techniques. As used herein, a "group of," when used with reference to items, means one or more items. For example, "a group of functions" is one or more functions.

In this illustrative example, application 124 may be selected from one of a payroll application, a human resources application, a word processor, a spreadsheet application, a database, or other suitable program that may be used to perform operation 126. Application 124 may be referred to as a web application when application 124 is part of web page 108 as illustrated in this example.

As depicted, operator 118 interacts with application 124 in web page 108 to perform operation 126. In this example, operator 118 is customer 128, and operation 126 may be, for example, setting compensation, performing payroll, performing a review, assigning a task, hiring, or other suitable real-world operations.

In this illustrative example, customer 128 may be a person or an organization. When customer 128 is an organization, one or more people in the organization may operate client data processing system 104. As depicted, the organization may be a company, a partnership, a charity, an educational group, a social group, a team, a government entity, or some other suitable organization.

In some cases, web page 108 may not be displayed on browser 110 in graphical user interface 112 on display system 114 as quickly as desired or expected. As depicted, profiler 130 may be used to profile web page 108 and, in particular, display web page 108.

As depicted, profiler 130 profiles application 124 as web page 108 with application 124 is processed for display. In this illustrative example, profiler 130 operates while web page 108 is processed for display in browser 110.

In this illustrative example, profiler 130 is located in web page 108. In other words, profiler 130 is integrated as part of web page 108 along with application 124. As a result, operator 118 does not need permissions in client data processing system 104 to install or run profiler 130.

Profiler 130 may be implemented in software, hardware, firmware, or a combination thereof. When software is used, the operations performed by profiler 130 may be implemented in program code configured to run on hardware, such as a processor unit. When firmware is used, the operations performed by profiler 130 may be implemented in program code and data and stored in persistent memory to run on a processor unit. When hardware is employed, the hardware may include circuits that operate to perform the operations in profiler 130.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

During operation, profiler 130 identifies components 132 in web page 108. Profiler 130 identifies times 134 to display components 132 for web page 108 in browser 110 in graphical user interface 112 on display system 114 for client data processing system 104 while components 132 are processed for display on display system 114 during use of application 124 by customer 128 to perform operation 126.

In the illustrative example, components 132 are parts of application 124. A component may provide a function or service that enables performing a task, activity, or other operation. Each component may be comprised of information selected from at least one of an image, a markup language, JavaScript, code, a stylesheet, a script, or other suitable information. For example, components 132 may be selected from at least one of new hire processing, payroll, benefits administration, human resources, a calendar, contacts, or some other suitable type of component.

In this illustrative example, profiler 130 creates profile 136 of times 134 to display a group of components 132 on display system 114 when user input 120 from customer 128 requests information about times 134 to display the group of components 132, enabling identifying corrective action 140 that increases a speed at which web page 108 is displayed on display system 114 for client data processing system 104. For example, corrective action 140 may be identified based on times 134 identified.

In the illustrative example, one or more technical solutions are present that overcome a technical problem with identifying why a web page is displayed on a client data processing system more slowly than desired using a profiler that is part of the web page that is displayed. As a result, one or more technical solutions may provide a technical effect in which the times displaying an application in a web page may be more accurately identified when profiling the web page as the web page is processed for display.

As a result, computer system 102 operates as a special purpose computer system in which profiler 130 in computer system 102 enables more easily identifying causes of delays in how fast web page 108 is displayed in browser 110 in graphical user interface 112 on display system 114 for client data processing system 104. In particular, profiler 130 transforms computer system 102 into a special purpose computer system as compared to currently available general computer systems that do not have profiler 130 as part of web page 108.

Figure 2:
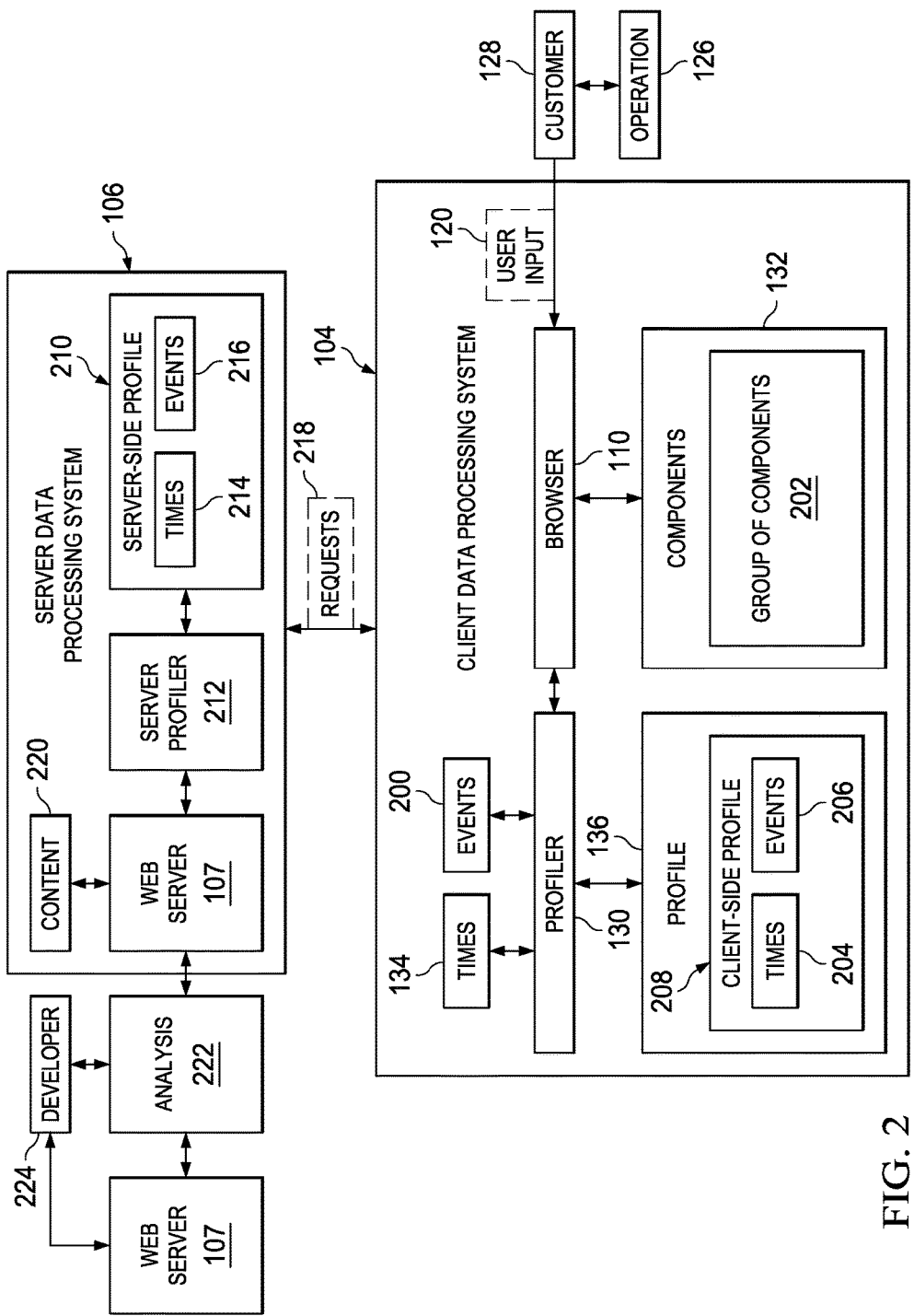
FIG. 2 is an illustration of a block diagram of dataflow used to generate a profile of times to display a web page in accordance with an illustrative embodiment.

With reference next to FIG. 2, an illustration of a block diagram of dataflow used to generate a profile of times to display a web page is depicted in accordance with an illustrative embodiment. In the illustrative examples, the same reference numeral may be used in more than one figure. This reuse of a reference numeral in different figures represents the same element in the different figures.

In this depicted example, profiler 130 operates while browser 110 runs on client data processing system 104 and displays web page 108. As depicted, operator 118 in the form of customer 128 loads web page 108 for display at client data processing system 104 for use in performing operation 126.

Profiler 130 in web page 108 is processed by browser 110 such that profiler 130 is running when application 124 in web page 108 is processed for display. In other words, browser 110 runs code for profiler 130 prior to processing components 132 in application 124.

In the illustrative example, all of components 132 may be processed when web page 108 is displayed. In the illustrative example, components 132 may not all be processed at the same time.

For example, a first portion of components 132 is processed when web page 108 is initially displayed. Another portion of components 132 may be displayed as customer 128 interacts with application 124 after the initial display of the first portion of components 132 for application 124 in web page 108. For example, some of components 132 may be processed for display in browser 110 as customer 128 selects those components for use.

As depicted, profiler 130 identifies times 134 to display components 132 in application 124 in browser 110 in graphical user interface 112 on display system 114. For example, profiler 130 detects events 200 that occur when browser 110 processes components 132 in application 124 to display web page 108. In the illustrative example, events 200 may take different forms. For example, events 200 may include at least one of rendering images, processing markup language, document object model (DOM) events, response time requests, and other events that occur as part of displaying web page 108.

Profiler 130 automatically records times 134 for events 200 that occur in displaying components 132 in application 124. The recording of times 134 occurs without needing user input 120 from operator 118 to start identifying times 134 for events 200.

In this depicted example, times 134 for events 200 are identified for components 132 in application 124. In other words, times 134 are identified for events 200 that occur to display each component in components 132. In this manner, an identification of components 132 that may need corrective action 140 may be made.

Corrective action 140 may take different forms. For example, corrective action 140 may include at least one of modifying the component in components 132, removing a component from components 132, modifying web server 107, changing web page 108, or other suitable actions. For example, the script for a component may be changed to increase the speed at which a component may be processed. In another example, processes in web server 107 for generating and delivering content for components 132 may be modified to increase the speed at which content may be delivered.

In this illustrative example, operator 118 may generate user input 120 to profiler 130 to generate profile 136. For example, user input 120 may be a location of the pointer over a component in components 132 and the pressing of "alt" and "click" keys. In other illustrative examples, more than one component in components 132 may be selected. As a result, profiler 130 generates profile 136 for group of components 202 in components 132 as selected by user input 120.

As depicted, times 134 for events 200 may be for all of components 132. Profile 136 includes times 204 in times 134 and events 206 in events 200 for group of components 202 based on a selection of components 132 from user input 120.

In this illustrative example, profile 136 is client-side profile 208. Additionally, server-side profile 210 may also be generated by server profiler 212 on server data processing system 106.

Server-side profile 210 includes times 214 for events 216 that occur on server data processing system 106 in response to web server 107 processing requests 218 from browser 110. Requests 218 are requests made by browser 110 as part of displaying web page 108. These requests may be, for example, for content, such as images, text, audio, video, or other content that may be displayed.

In the illustrative example, web server 107 may process content 220 when content 220 is requested for web page 108 by browser 110 in requests 218. For example, in requesting content 220, browser 110 may request a list of objects as part of the process to display web page 108. Objects may include, for example, at least one of images, files, stylesheets, or other objects used to display web page 108. Web server 107 may perform at least one of locating or generating content 220 in response to requests 218. Times 214 and events that occur in processing content 220 are identified by server profiler 212.

Further, with client-side profile 208 and server-side profile 210, the transport time for sending a response from server data processing system 106 to client data processing system 104 may be identified. For example, client-side profile 208 may include a first time in times 204 to receive a response to a request from web server 107 in server data processing system 106. Server-side profile 210 may include a second time in times 214 for processing the request received from browser 110 in client data processing system 104.

The difference between the first time and the second time is the transport time from server data processing system 106 to client data processing system 104. This information may be used identify when the undesired amount of time to display web page 108 is a result of the transport time. As a result, changes to web page 108 or the manner in which web server 107 operates may not need to be modified.

Thus, with client-side profile 208 and server-side profile 210, a more complete picture of the times and events to display web page 108 is present. For example, with client-side profile 208 and server-side profile 210, an identification is made as to whether which one of web page 108, components 132 in application 124, browser 110, graphical user interface 112, web server 107, and other components in computer system 102 may contribute to an undesirable speed at which web page 108 is displayed. In this manner, the illustrative example enables identifying a corrective action that increases the speed at which web page 108 is displayed in browser 110 in graphical user interface 112 on display system 114 for client data processing system 104.

For example, analysis 222 may be performed by web server 107. Analysis 222 may be used to identify corrective action 140. In some illustrative examples, corrective action 140 may be suggested by web server 107. For example, web server 107 may include more access to a knowledge base, an artificial intelligence system, a neural network system, or some other suitable system that may identify corrective action 140.

In other list of examples, developer 224 may review analysis 222 and identify corrective action 140. With corrective action 140, changes may be made to computer system 102 to increase the speed at which web page 108 is displayed on display system 114 for client data processing system 104. These changes may include changes for at least one of web page 108, components 132 in application 124, browser 110, graphical user interface 112, web server 107, or other components in computer system 102.

Figure 3:
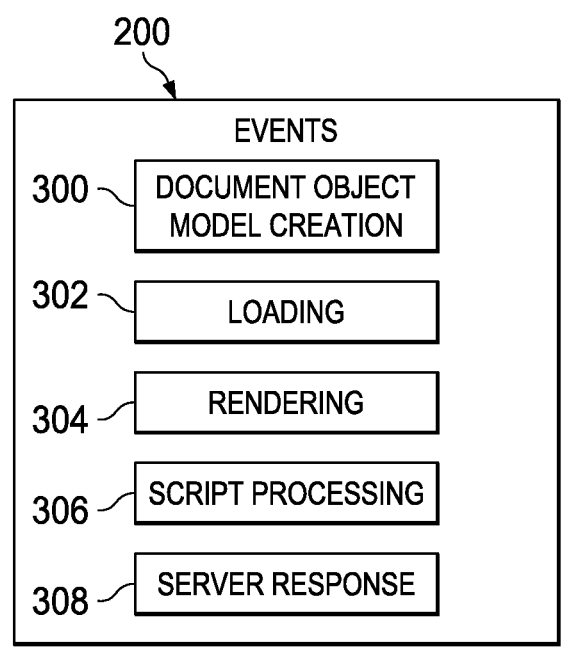
FIG. 3 is an illustration of a block diagram of events in accordance with an illustrative embodiment.

With reference now to FIG. 3, an illustration of a block diagram of events is depicted in accordance with an illustrative embodiment. In this figure, examples of events 200 are shown. As depicted, events 200 includes document object model (DOM) creation 300, loading 302, rendering 304, script processing 306, and server response 308.

Document object model creation 300 includes the actions that occur in loading and constructing a document object model for web page 108. The creation of the document object model may include actions such as downloading content, requesting content, constructing the model, and other actions that occur in creating the document object model. The times for this event may be useful in determining whether changes may be needed.

In this illustrative example, loading 302 is an event in which an object is loaded for web page 108. The object may be retrieved from a server or from a local cache in client data processing system 104 in this illustrative example.

As depicted, rendering 304 is an event in which the object is processed for display. In this event, the object has been loaded but not yet processed for display. For example, rendering 304 may be for an image, the control, a graphic, an animation, or some other object that is displayed for web page 108 in browser 110.

Script processing 306 is an event in which a code or scripts for the web page are processed when processing web page 108 for display browser 110. The script is a list of commands written in a language such as JavaScript, AppleScript, Python, or some other scripting language.

In this illustrative example, server response 308 is an event in which the server sends a response after browser 110 sends a request with respect to web page 108. For example, a RESTful service, JavaScript object notation (JSON), or other service may send a response to browser 110 in response to a request made by browser 110. The time of the response may be useful in determining whether an issue with the time to display web page 108 is associated with server data processing system 106 instead of web page 108 or client data processing system 104.

The illustration of web page environment 100 and the different components in FIGS. 1-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, profiler 130 has been described as operating when application 124 is used by customer. In another illustrative example, profiler 130 also may be used when application 124 is in development. The development may be, for example, when application 124 is initially created or when improvement, patches, or new versions of application 124 are developed. Thus, profiling may be performed during at least one of use of the application 124 by customer 128 or development of application 124.

In the illustrative example, profiler 130 has been described as operating when displaying web page 108 by customer 128. In other illustrative examples, profiler 130 also may be used when operator 118 takes the form of a programmer or developer. For example, profiler 130 may be used when developing web page 108. In still another example, other types of events may be used in addition to or in place of the ones shown for events 200 in FIG. 3.

Figure 4:
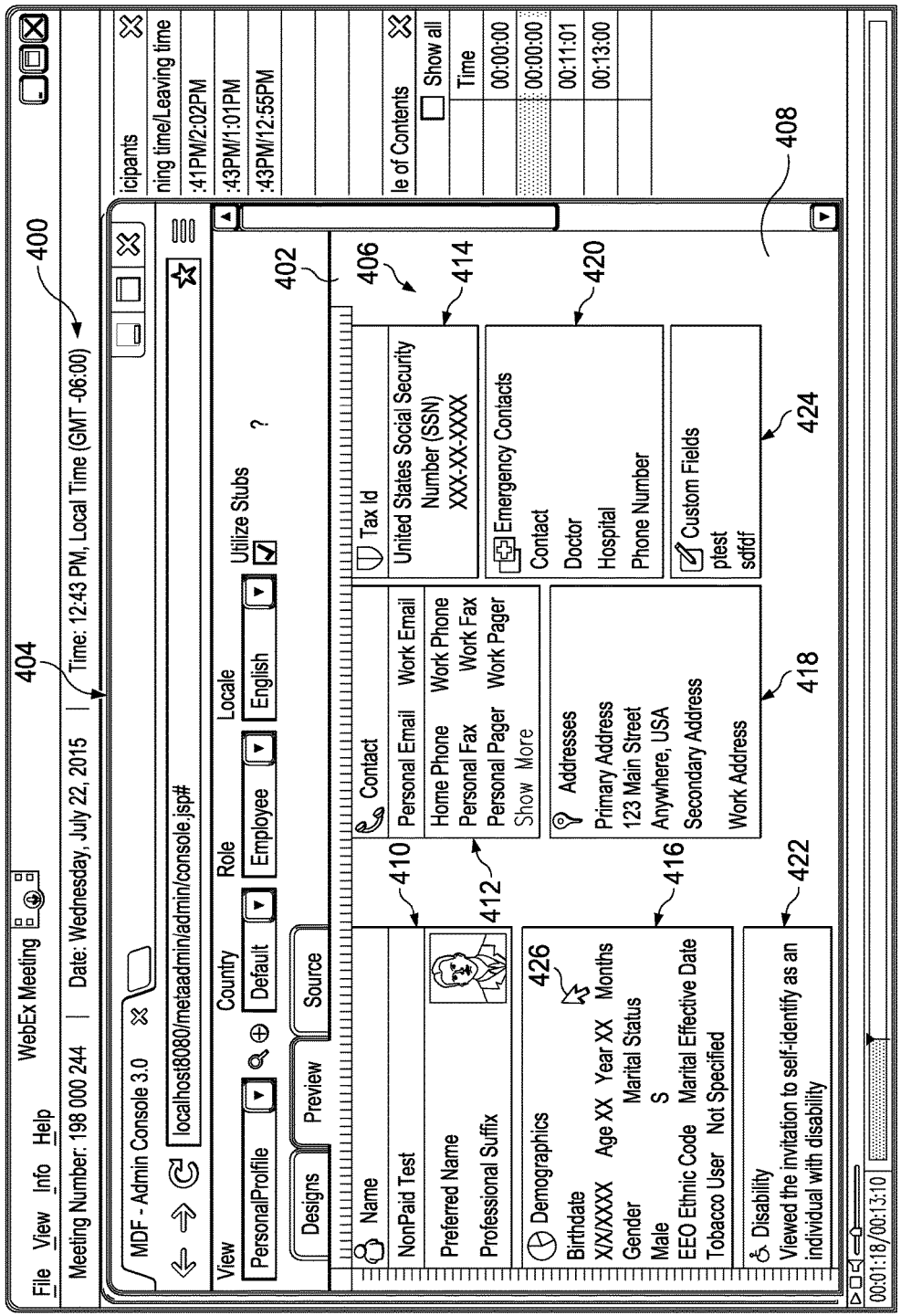
FIG. 4 is an illustration of an application in a web page displayed in a browser in accordance with an illustrative embodiment.

With reference next to FIGS. 4-7, illustrations of an application in a web page and profiles generated for components are shown. Turning first to FIG. 4, an illustration of an application in a web page displayed in a browser is depicted in accordance with an illustrative embodiment. In this illustrative example, application 400 is in web page 402 that is displayed in browser 404 in graphical user interface 406.

As depicted, graphical user interface 406 is an example of an implementation for graphical user interface 112 shown in block form in FIG. 1. Browser 404 is an example of an implementation of browser 110 shown in block form in FIG. 1, and application 400 in web page 402 is an example of an implementation of application 124 in web page 108 shown in block form in FIG. 1.

In this illustrative example, events and times are recorded by a profiler but are not seen in this view. The profiler runs without the operator knowing that the profiler is executing, in the depicted example. In this example, the profiler is running when browser 404 processes application 400 and web page 402 for display.

As depicted in this figure, components 408 are shown for application 400. Components 408 are the components initially displayed to the operator for application 400 when web page 402 is displayed.

In this illustrative example, components 408 include eight components. As depicted, components 408 include Name 410, Contact 412, Tax ID 414, Demographics 416, Addresses 418, Emergency Contacts 420, Disability 422, and Custom Fields 424.

In this illustrative example, pointer 426 is located over Demographics 416. The selection of Demographics 416 results in a profile being created for this component.

Figure 5:
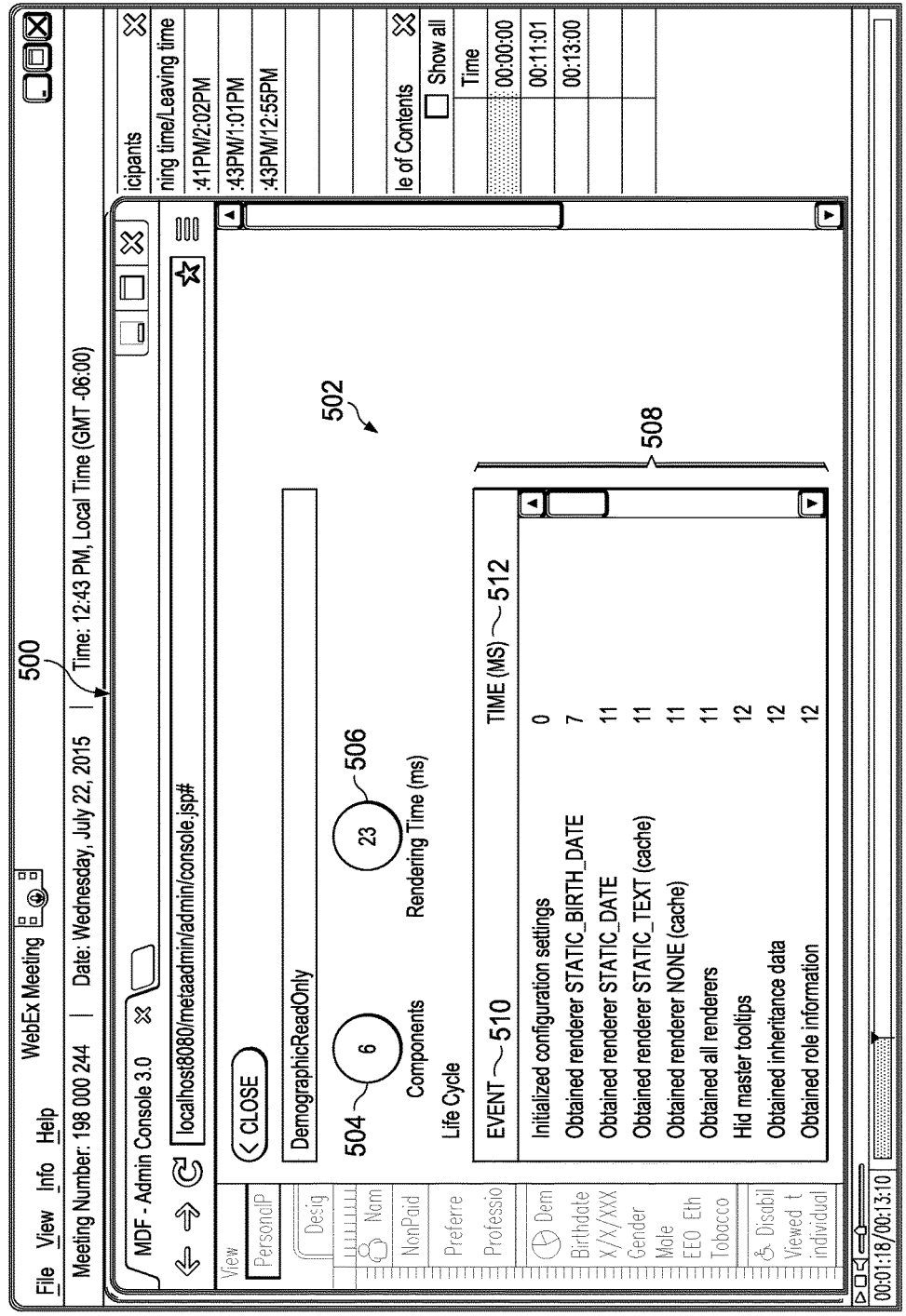
FIG. 5 is an illustration of a profile in accordance with an illustrative embodiment.

With reference now to FIG. 5, an illustration of a profile is depicted in accordance with an illustrative embodiment. In this depicted example, window 500 is displayed for browser 110 in response to the selection of Demographics 416 in FIG. 4.

In this illustrative example, window 500 displays profile 502 for Demographics 416. In this example, profile 502 is created from events and times for events that were recorded during processing of components 408 in application 400 for display in browser 404.

As depicted, profile 502 for Demographics 416 includes components that are part of Demographics 416. For example, the selection of Demographics 416 may result in the display of another window (not shown) with components that may be used to perform functions, tasks, activities, or other operations. These components for Demographics 416 are the components for which events and times are placed into profile 502 for Demographics 416

In this example, indicator 504 shows that Demographics 416 has six components. Indicator 506 displays the time to display these components. The time is 23 milliseconds in this example.

Section 508 illustrates events in column 510 and times in column 512. The events in column 510 are events that occur to display Demographics 416 when Demographics 416 is selected for use by the operator. The times in column 512 are the times for the events.

Figure 6:
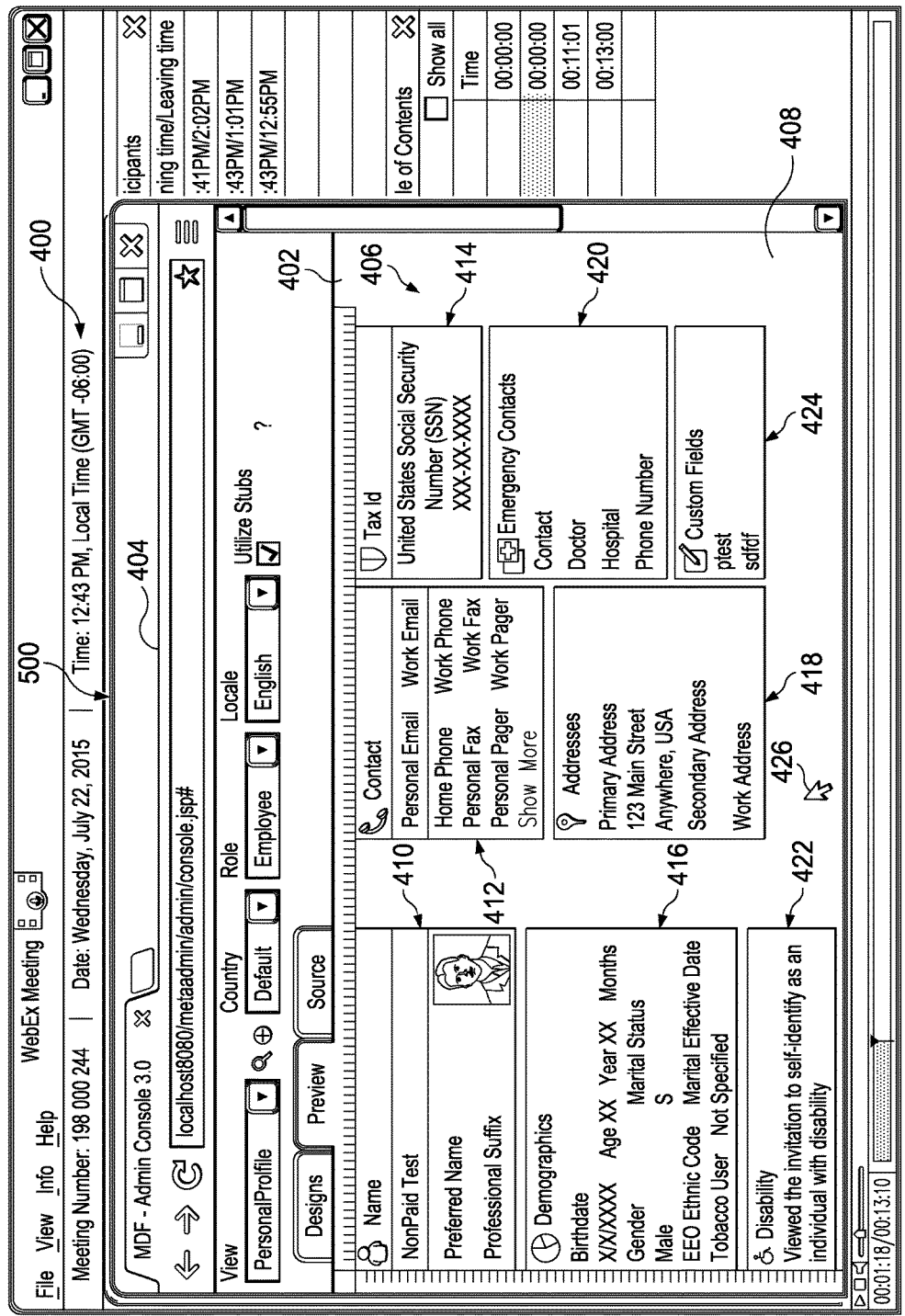
FIG. 6 is an illustration of an application in a web page displayed in a browser in accordance with an illustrative embodiment.

Turning now to FIG. 6, an illustration of an application in a web page displayed in a browser is depicted in accordance with an illustrative embodiment. In this figure, pointer 426 is located over window 500. As depicted, window 500 is a visual representation of the container for components 408. Selection of window 500 creates a profile for displaying components 408 in this illustrative example.

Figure 7:
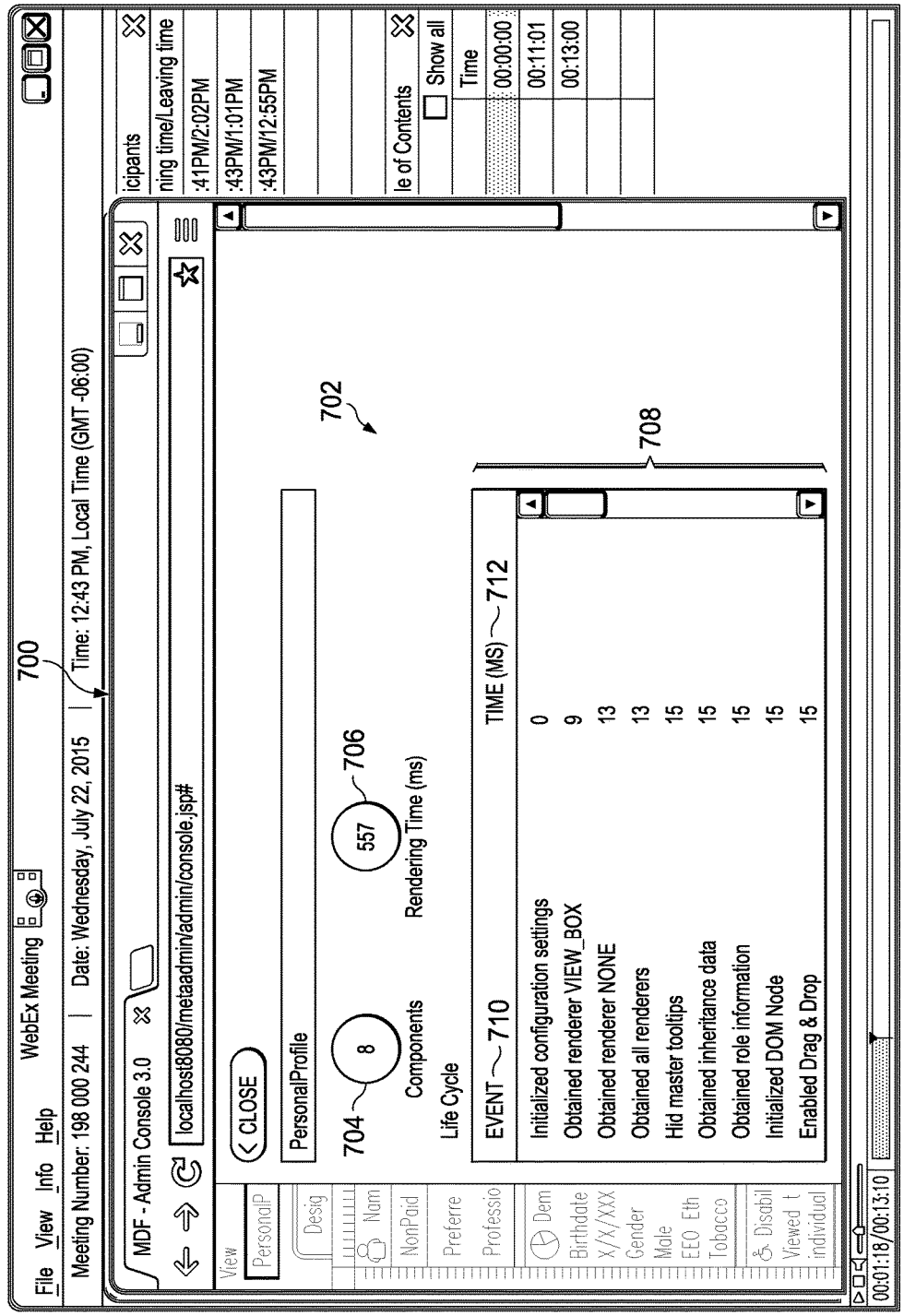
FIG. 7 is an illustration of a profile in accordance with an illustrative embodiment.

With reference now to FIG. 7, an illustration of a profile is depicted in accordance with an illustrative embodiment. In this illustrative example, window 700 shows profile 702 for components 408 in FIG. 4.

As depicted, indicator 704 shows profile 502 has eight components. Indicator 706 shows the time to display the eight components is 557 milliseconds.

Section 708 shows events in column 710 and times in column 712. The events are events that occur to display Name 410, Contact 412, Tax ID 414, Demographics 416, Addresses 418, Emergency Contacts 420, Disability 422, and Custom Fields 424 for application 400 in browser 404 in FIG. 4.

With reference next to FIGS. 8-14, an illustration of an information environment in which profiling of a web page may be performed is depicted in accordance with an illustrative embodiment. In this illustrative example, profiler 130 may be used to identify times for displaying web pages.

Figure 8:
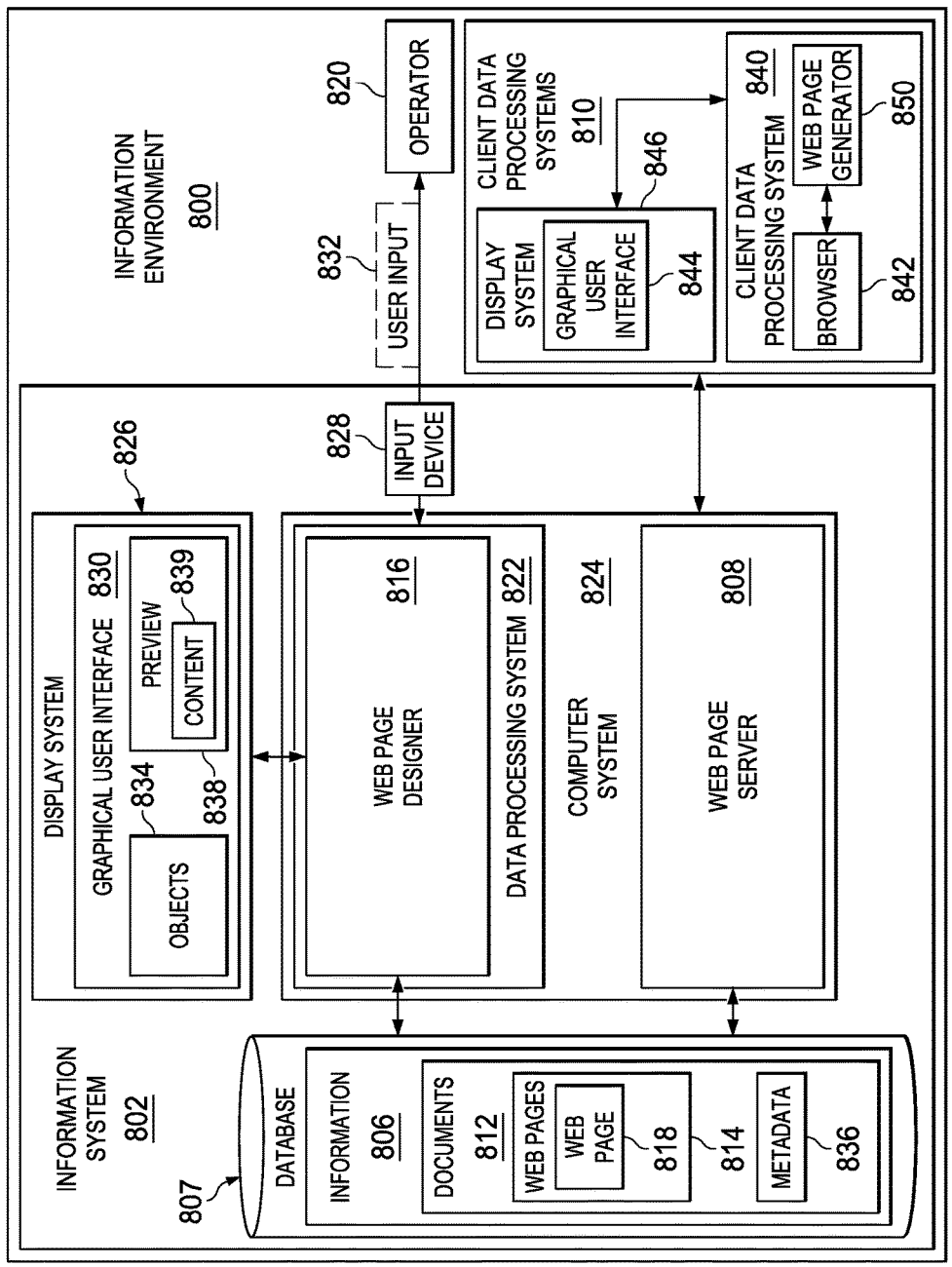
FIG. 8 is an illustration of a block diagram of an information environment in accordance with an illustrative embodiment.

With reference to FIG. 8, an illustration of a block diagram of an information environment is depicted in accordance with an illustrative embodiment. In this illustrative example, information environment 800 includes information system 802. Information system 802 provides access to information 806 stored in database 807. As depicted, database 807 may be a storage system in a single location or may be distributed.

For example, web page server 808 sends information 806 to client data processing systems 810 operated by users. In this illustrative example, client data processing systems 810 are hardware systems that may include software. For example, client data processing systems 810 may be selected from at least one of a computer, a server computer, a workstation, a tablet computer, a laptop computer, a mobile phone, or some other suitable data processing system that may be used by users 804.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category. In this illustrative example, a portion of information 806 takes the form of documents 812. As depicted, documents 812 may be web pages 814 that are displayed on client data processing systems 810.

As depicted, web pages 814 are designed using web page designer 816. For example, web page 818 may be designed by operator 820 interacting with web page designer 816.

Web page designer 816 may be implemented in software, hardware, firmware, or a combination thereof. When software is used, the operations performed by web page designer 816 may be implemented in program code configured to run on hardware, such as a processor unit. When firmware is used, the operations performed by web page designer 816 may be implemented in program code and data and stored in persistent memory to run on a processor unit. When hardware is employed, the hardware may include circuits that operate to perform the operations in web page designer 816.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, web page designer 816 may be implemented in data processing system 822 within computer system 824. Computer system 824 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In the illustrative example, display system 826 and input device 828 are in communication with data processing system 822. These components aid operator 820 in interacting with web page designer 816.

A display system is a hardware system and includes one or more display devices on which graphical user interface 830 may be displayed. The display devices may include at least one of a light-emitting diode display (LED), a liquid crystal display (LCD), an organic light-emitting diode display (OLED), or some other suitable device on which graphical user interface 830 can be displayed. Operator 820 may interact with graphical user interface 830 through user input 832 generated by input device 828. Input device 828 may be, for example, a mouse, a keyboard, a trackball, a touchscreen, a stylus, or some other suitable type of input device.

In operation, web page designer 816 in data processing system 822 displays objects 834 in graphical user interface 830 in display system 846. As depicted, objects 834 are selectable for use in designing web page 818.

In the illustrative example, an object in objects 834 is used in web page 818. The object may be selected from one of a graphical element, a functional element, a script, a graphical control, or some other object that is used in web page 818. A functional element performs some step, operation, or function. The functional element may not be visible. The functional element may be a script, a plug in, an extension, or some other suitable component.

Web page designer 816 generates metadata 836 for web page 818 based on user input 832 selecting a group of objects 834 for web page 818. As used herein, a "group of," when used with reference to items, means one or more items. For example, a group of objects 834 is one or more of objects 834.

Web page designer 816 generates metadata 836 in a number different ways. For example, in generating metadata 836, web page designer 816 may perform at least one of creating new data for metadata 836, modifying metadata 836, or some other suitable action. Thus, metadata 836 may be entirely new metadata. In some cases, metadata 836 may be generated from modifying existing metadata.

In this illustrative example, metadata 836 describes web page 818. For example, metadata 836 may describe at least one of what information is to be displayed, how the information is to be displayed, and where the information is to be displayed in web page 818.

In generating metadata 836 for web page 818, web page designer 816 does not generate hypertext markup language or cascading style sheets for web page 818. Web page designer 816 does not generate markup language for web page 818 because web page 818 is described using metadata 836. The markup language may be, for example, hypertext markup language or cascading style sheets.

Even though markup language may not be generated, metadata 836 may be generated for components in an application. For example, metadata 836 may be generated for components in an application in web page 818.

In the illustrative example, web page designer 816 creates preview 838 of web page 818 from metadata 836. Web page designer 816 displays preview 838 of web page 818 in graphical user interface 830 in display system 826.

Preview 838 is how web page 818 will look when displayed on one of client data processing systems 810. In preview 838, web page 818 may not be complete. As a result, preview 838 may show how web page 818 will look on client data processing systems 810 as currently designed. In other words, preview 838 does not require web page 818 to be completed.

Additionally, preview 838 may include content 839 for web page 818. Also, content 839 used in preview 838 may be in a language that is selected based on one of the location of client data processing system 840 and a user preference for the languages. Further, the preview may be performed using profiler 130 to identify times for displaying components in an application for web page 818.

As depicted, content 839 is something that is to be expressed in web page 818, as opposed to describing how or what something looks like in web page 818. Content 839 may include at least one of text, images, video, audio, graphics, or other information that is put into web page 818. In contrast, metadata 836 describes what web page 818 looks like. For example, metadata 836 may describe what information is to be displayed, how the information is to be displayed, and where the information is to be displayed in web page 818.

Once web page 818 is completed, web page designer 816 stores web page 818 in database 807 with web pages 814. As depicted, the storage of web page 818 is storing metadata 836 for web page 818. Other ones of web pages 814 also may have metadata 836 that describe how those ones of web pages 814 will look when displayed on client data processing systems 810. In storing metadata 836 in database 807 for web page 818, web page designer 816 does not store markup language for web page 818. Web page designer 816 does not store markup language for web page 818 because web page 818 is described using metadata 836.

Web page designer 816 may retrieve metadata 836 for web page 818 from database 807 after metadata 836 has been saved in database 807. For example, web page designer 816 may retrieve metadata 836 to make modifications to metadata 836 for web page 818. In this manner, operator 820 may modify existing web pages in web pages 814.

In the illustrative example, client data processing system 840 in client data processing systems 810 may access and display web pages 814. For example, after web page 818 is designed using web page designer 816, client data processing system 840 may retrieve metadata 836 for web page 818.

In this illustrative example, metadata 836 for web page 818 may be obtained from web page server 808. Web page server 808 may retrieve metadata 836 for web page 818 from database 807. In this illustrative example, web page server 808 is not used to retrieve markup language for web page 818. Metadata 836 is obtained from web page server 808 because web page 818 is described using metadata 836.

Client data processing system 840 in client data processing systems 810 receives metadata 836 describing web page 818. In this illustrative example, browser 842 in client data processing system 840 displays web page 818. For example, web page 818 is displayed by browser 842 in graphical user interface 844 in display system 846 for client data processing system 840.

In this illustrative example, browser 842 is a program or application. Browser 842 in graphical user interface 844 displays web page 818 in graphical user interface 844 in display system 846. Browser 842 is configured to interpret web pages 814 received from web page server 808 to display web pages 814. For example, browser 842 may interpret markup language, metadata 836, and other information to display web pages 814.

As depicted, metadata 836 defines what web page 818 looks like without content 839 for web page 818. In this illustrative example, client data processing system 840 identifies content 839 needed for web page 818 based on metadata 836. In this illustrative example, content 839 is stored and retrieved from database 807.

As depicted, content 839 may be a portion of information 806 that is displayed in web page 818. The client data processing system obtains content 839 for web page 818.

With content 839, web page generator 850 in client data processing system 840 creates web page 818 using metadata 836 and content 839 without using a markup language. For example, web page generator 850 may create at least one of a document object model data structure for web page 818 or some other suitable type of data structure for web page 818. These data structures generated by web page generator 850 for web page 818 do not have markup language. Markup languages are selected from at least one of hypertext markup languages, cascading style sheets, or other suitable types of markup languages.

Because markup languages may have different versions, these markup languages may not support features described by metadata 836. Using metadata 836 to generate web page 818 without using a markup language may result in a more accurate and uniform representation of web page 818 when displayed on client data processing system 840.

In the illustrative example, web page generator 850 displays web page 818 on graphical user interface 844 in display system 846 for client data processing system 840. The display of web page 818, in this example, does not use browser 842.

In another illustrative example, web page generator 850 may send web page 818 to browser 842. Browser 842 may then display web page 818 without using a markup language.

In still another illustrative example, web page generator 850 may be a module located in browser 842. As a module, web page generator 850 creates web page 818 in browser 842 without using a markup language. Browser 842 may then display web page 818. In other words, web page generator 850 enables browser 842 to display web page 818 that is based on metadata 836 and content 839.

Thus, the illustrative examples provide a method and apparatus for designing web pages. In one illustrative example, a method and apparatus provide one or more technical solutions that overcome the technical problem of the knowledge and experience about web page servers needed to design web pages. In another illustrative example, a method and apparatus provide one or more technical solutions that overcome the technical problem of designing web pages for display on different types of browsers. In the technical solution, the process implemented in web page designer 816 using metadata 836 has a technical effect that avoids operator 820 needing knowledge and experience about web page server 808. Additionally, the technical solution provided by this process has a technical effect of reducing the need for operator 820 to design web page 818 on different types of browsers to see whether web page 818 has a desired display on those browsers. Metadata 836 describes web page 818 and is not browser dependent in this illustrative example.

Thus, operator 820 may focus on designing web page 818 rather than identifying differences in the manner in which web page 818 may be displayed on different browsers. Additionally, operator 820 does not need to access or have knowledge or experience about web page server 808. Operator 820 may focus on designing web page 818 for a particular look, feel, function, or other goal.

The illustrative example also solves the technical problem of having insufficient resources for Web page servers to generate web pages. In the illustrative example, a technical solution is present in which client data processing system 840 generates web page 818 using metadata 836 for web page 818. Additionally, client data processing system 840 also retrieves content 839 for use in generating web page 818.

The technical effect is reducing resources that are needed for web page server 808. For example, web page server 808 may only send metadata 836 and does not need to use resources to generate web page 818. As a result, times at which web pages 814 are generated with a lower than desired time may be reduced. Further, web pages 814 may be displayed more quickly on client data processing systems 810 even when high levels of traffic are present on web page server 808 in the illustrative example.

For example, current web page servers process the markup language for a web page and find the content for the web page. The current web page servers then send the web page and the content to the browser on the client data processing system to display.

In contrast, web page server 808 sends metadata 836 for web page 818 to client data processing system 840. Web page generator 850 in client data processing system 840 processes metadata 836 to form a visualization for web page 818 that is displayed in graphical user interface 844 in display system 846. Also, in this example, web page generator 850 also requests content 839 for web page 818. Web page generator 850 displays web page 818 with content 839 for web page 818.

As a result, the technical effect is that less processing resources are needed for web page server 808 in data processing system 822. Also, web pages 814 may be displayed more quickly in client data processing systems 810 even when high traffic is present for web page server 808. The quicker display occurs because lower wait time is present for obtaining metadata 836 from web page server 808 as compared to current processes that deliver web pages.

In the illustrative example, data processing system 822 operates as a special purpose computer in which web page designer 816 in data processing system 822 enables a more efficient design of web page 818. For example, web page designer 816 reduces the knowledge and experience about web page servers needed by operator 820. Web page designer 816 also creates metadata 836 in a manner that avoids operator 820 from having to view preview 838 of web page 818 on different types of browsers to determine whether web page 818 will be displayed in a desired manner on different types of browsers. In particular, web page designer 816 transforms data processing system 822 into a special purpose computer as compared to currently available general purpose computers that do not have web page designer 816.

Data processing system 822 transforms information 806 such that information 806 has a different function or has a different use. For example, web pages 814 are stored as metadata 836 in database 807. Metadata 836 is transformed into a form for display on graphical user interface 830 in display system 826 for data processing system 822. This transformation occurs when generating preview 838 of web page 818. In other words, a visualization of web pages 814 may be generated as compared to the manner in which web pages 814 are stored in database 807.

Additionally, a similar transformation of information 806 also occurs when displaying web page 818 in graphical user interface 844 in display system 846 for client data processing system 840. Additionally, in displaying web page 818 as preview 838 in graphical user interface 830 in display system 826 for data processing system 822, or displaying web page 818 using browser 842 in graphical user interface 844 in display system 846 in client data processing system 840, content 839 may be identified and placed in web page 818 using metadata 836. These and the other transformations of information 806 in the illustrative example are more than a mere display of information 806 stored in database 807.

The illustration of information environment 800 in FIG. 8 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in addition to storing metadata 836 for web pages 814, other web pages may be present in addition to or in place of web pages 814 that are described using markup languages such as hypertext markup language (HTML), extensible markup language (XML), or some other suitable type of markup language. These types of web pages, however, may require different versions for different types of browsers in order to have a desired consistency for how the web pages are displayed on client data processing systems 810.

As another illustrative example, metadata 836 for web page 818 may be obtained from other locations other than from web page server 808. For example, metadata 836 may be located in a local cache in a client data processing system, a proxy server, a data processing system that is remote to data processing system 822, or some other location. In this example, data processing system 822 is a first data processing system and the data processing system that is remote to data processing system 822 is a second data processing system.

As another example, content 839 may be located in other locations other than database 807. For example, content 839 may be obtained from another server other than web page server 808.

In other illustrative examples, a copy of content 839 may be stored locally on client data processing system 840. In these other illustrative examples, accessing the copy of content 839 stored locally on client data processing system 840 enables web page designer 816 to create preview 838 with content 839 without accessing a server for content 839.

Figure 9:
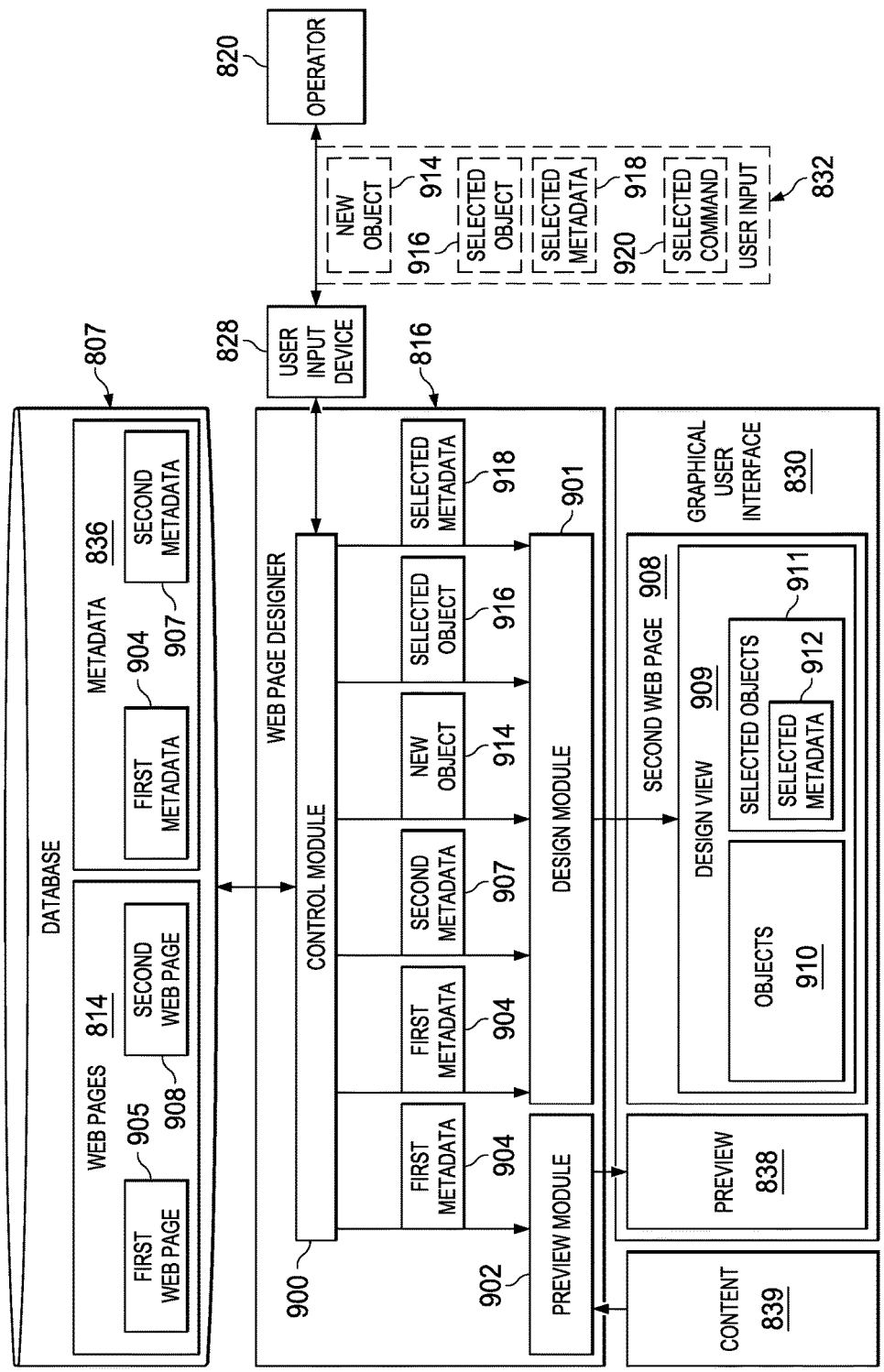
FIG. 9 is an illustration of a block diagram of data flow for designing web pages in accordance with an illustrative embodiment.

With reference next to FIG. 9, an illustration of a block diagram of data flow for designing web pages is depicted in accordance with an illustrative embodiment. In this figure, an example of data flow for a process for designing metadata 836 for web pages 814 through web page designer 816 is shown. In the illustrative examples, the same reference numeral may be used in more than one figure. This reuse of a reference numeral in different figures represents the same element in the different figures.

In this illustrative example, web page designer 816 has a number of different components. As used herein, a "number of items" means one or more items. For example, a number of different components means one or more components.

As depicted, web page designer 816 includes control module 900, design module 901, and preview module 902. Web page designer 816 uses these components to generate web pages 814. Web page designer 816 generates web pages 814 by at least one of creating new web pages or modifying existing web pages in web pages 814.

As depicted, control module 900 creates first metadata 904 for first web page 905 when operator 820 creates first web page 905 interacting with control module 900. For example, control module 900 may create first metadata 904 using objects selected by operator 820 for first web page 905. In other words, the presence of objects may be initially absent in first metadata 904 when web page designer 816 is being used to create first web page 905. First web page 905 is an example of web page 818 and first metadata 904 in metadata 836 is an example of metadata 836 for web page 818.

In this particular example, control module 900 retrieves first metadata 904 for first web page 905 from database 807 when operator 820 modifies first web page 905. Control module 900 sends first metadata 904 and second metadata 907 to design module 901. Control module 900 also sends first metadata 904 to preview module 902.

Control module 900 receives changes to first metadata 904 through user input 832 as illustrated in this figure. Control module 900 stores first metadata 904 for first web page 905 in database 807.

As depicted, design module 901 receives first metadata 904 for first web page 905 and second metadata 907 for second web page 908 from control module 900. Design module 901 creates design view 909 from second metadata 907 for second web page 908. In this illustrative example, design view 909 is displayed in graphical user interface 830. Design view 909 is an interface displayed by design module 901 to operator 820.

In this illustrative example, design view 909 is used by operator 820 to visually design web pages 814. The designing of web pages 814 may include creating new web pages in web pages 814, modifying existing web pages in web pages 814, or some combination thereof.

In displaying design view 909, design module 901 in web page designer 816 displays objects 910 and selected objects 911 in second web page 908. Second web page 908 is generated by design module 901 from second metadata 907. Second metadata 907 may be stored and retrieved from database 807 in this example.

Thus, database 807 may include metadata 836 for web pages 814 that are accessed by client data processing system 840. Additionally, database 807 also may include second metadata 907 for second web page 908 for design view 909 used by operator 820 at data processing system 822. In other illustrative examples, second metadata 907 may be stored in other locations, such as in data processing system 822.

As depicted, second web page 908 forms design view 909 in graphical user interface 830. Operator 820 interacts with design view 909 to design first web page 905. In other words, design view 909 may be a web page similar to web page 818 and web pages 814 that are designed by operator 820.

In this illustrative example, the process includes generating metadata 836 for web pages 814. For example, first web page 905 may be modified by modifying first metadata 904 for first web page 905 through operator 820 interacting with second web page 908. As depicted, design module 901 creates design view 909 to receive user input 832 for generating first metadata 904 for first web page 905.

As shown in this figure, design view 909 includes objects 910 and a group of selected objects 911. Objects 910 are examples of objects 834 in FIG. 8. In the illustrative example, one or more of objects 910 may be added to the group of selected objects 911 through user input 832.

As depicted, design module 901 identifies the group of selected objects 911 from first metadata 904. Design module

901 also identifies selected metadata 912 for the group of selected objects 911 from first metadata 904. Selected metadata 912 is first metadata 904 for first web page 905. Design module 901 displays the group of selected objects 911 in design view 909 based on selected metadata 912.

In this illustrative example, control module 900 receives user input 832 at design view 909 displayed in graphical user interface 830 through input device 828. Design module 901 receives new object 914 from user input 832 through control module 900. New object 914 is an object that is used to create an object for first web page 905. For example, new object 914 may be a button that operator 820 adds to first web page 905.

Operator 820 may identify new object 914 through user input 832 that selects new object 914 in objects 910. For example, user input 832 may be a drag and drop operation of new object 914 from objects 910 to the group of selected objects 911.

As depicted, design module 901 receives selected object 916 from user input 832 through control module 900. Selected object 916 is an object selected from the group of selected objects 911. Design module 901 displays selected metadata 912 for selected object 916 when selected object 916 is received.

Design module 901 receives selected metadata 918 from user input 832 through control module 900. Selected metadata 918 is at least one of user input that creates selected metadata 912 for selected objects 911 or user input that changes selected metadata 912 for selected objects 911.

In this illustrative example, control module 900 modifies first metadata 904 based on changes to the group of selected objects 911 and selected metadata 912. For example, when new object 914 is added to the group of selected objects 911 in design view 909, control module 900 also adds new object 914 to first metadata 904.

Control module 900 receives selected command 920 through input device 828. Selected command 920 is a command to perform at least one of retrieving first metadata 904, storing first metadata 904, generating preview 838 based on first metadata 904, generating design view 909 based on first metadata 904, or some other suitable action.

In this illustrative example, control module 900 retrieves first metadata 904 for first web page 905 from database 807 when the command to retrieve first metadata 904 is received. Control module 900 also sends first metadata 904 to design module 901 and preview module 902 when the command to retrieve first metadata 904 is received. As depicted, control module 900 stores first metadata 904 in database 807 when the command to store first metadata 904 is received.

The illustration of data flow for designing web page 818 shown in FIG. 9 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, instead of displaying design view 909 in second web page 908, design module 901 may display design view 909 in any suitable type of window in graphical user interface 830. In this example, design module 901 may create the window in graphical user interface 830 for which design module 901 displays design view 909.

As another example, design module 901 may create second web page 908 in a window for a browser. In this example, the browser displays the window in graphical user interface 830.

Figure 10:
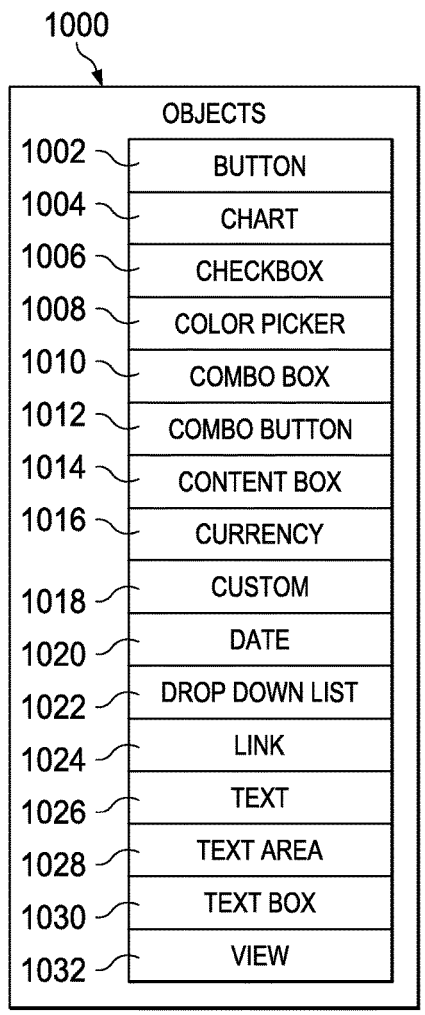
FIG. 10 is an illustration of a block diagram of objects in accordance with an illustrative embodiment.

With reference now to FIG. 10, an illustration of a block diagram of objects is depicted in accordance with an illustrative embodiment. In this illustrative example, objects 1000 are examples of objects 834 in FIG. 8 and objects 910 in FIG. 9. Objects may be selected for a web page from objects 1000 in this example.

As depicted, objects 1000 include button 1002, chart 1004, check box 1006, color picker 1008, combo box 1010, combo button 1012, content box 1014, currency 1016, custom 1018, date 1020, drop down list 1022, link 1024, text 1026, text area 1028, text box 1030, and view 1032.

In this illustrative example, view 1032 is an object that includes a group of objects with a layout. A layout for a group of objects is a description of how the group of objects are arranged relative to each other on a graphical user interface when the group of objects are displayed. For example, view 1032 may be included in metadata for a web page for storing information for the group of objects included in view 1032 and information for the layout of the group of objects. This information is placed into the metadata for the web page.

In these illustrative examples, a portion of the objects in the group of objects included in view 1032 may also be views. These views, in turn include other groups of objects. These views are used to form a hierarchy for the objects for the web page. As depicted, the hierarchy represents parent to child relationships for the objects. In other words, view 1032 is an object that is the parent of a group of objects. The group of objects included in view 1032 are children of view 1032.

Button 1002 is an object in a web page that displays text. Button 1002 is selectable. Selecting button 1002 performs an action for the web page. This action is at least one of retrieving dynamic content for the web page, saving data entered into the web page, displaying another web page, or any other suitable type of action for a button on a web page. Chart 1004 is a table that displays rows and columns of other objects in objects 1000.

Currency 1016 is an entry field for entering a monetary amount. The display of currency 1016 is based on a format for currency for a selected locale. For example, if the selected locale is United States English, the monetary amount in currency 1016 may be displayed in the format $xxx,xxx.xx. Custom 1018 is an entry field with a custom format.

Objects 1000 may also include at least one of additional types of objects, or different types of objects. For example, color picker 1008 may not be included in objects 1000. As another example, objects 1000 may include a slider bar for selecting from a group of options with the slider bar.

Figure 11:
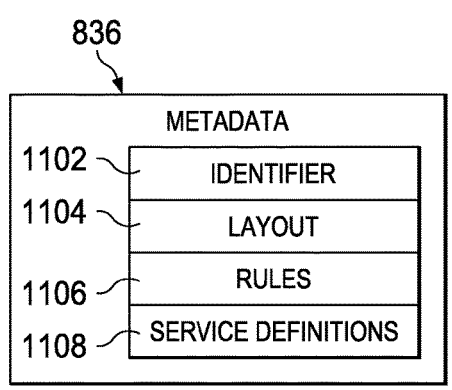
FIG. 11 is an illustration of a block diagram of metadata in accordance with an illustrative embodiment.

Turning to FIG. 11, an illustration of a block diagram of metadata is depicted in accordance with an illustrative embodiment. In this illustration, an example of a number of components of metadata 836 for web page 818 is shown.

As depicted, metadata 836 includes identifier 1102, layout 1104, rules 1106, and service definitions 1108. Identifier 1102 points to web page 818. For example, identifier 1102 may be a universal resource locator for web page 818. Layout 1104 in metadata 836 is a layout for objects displayed on web page 818.

Rules 1106 are in metadata 836. In the illustrative example, rules 1106 are at least one of code that performs actions for objects in layout 1104 or options used by code to perform actions for objects in layout 1104. For example, if the layout for web page 818 includes a button, a rule in rules 1106 for the button may be to execute code that performs an action for the button when a user input selects the button.

In this illustrative example, when a rule in rules 1106 for an object in objects 1000 in layout 1104 is located in metadata 836, the rule is an embedded rule for the object. In other words, the rule in rules 1106 is embedded in metadata 836 for the object for web page 818 when the rule is included in metadata 836 for the object for web page 818.

Service definitions 1108 is configuration information for sending and receiving user data and content 839. User data is data in objects entered by an operator. For example, if the layout for web page 818 includes a text box for entering in text, the text entered by the operator is user data.

The configuration information in service definitions 1108 includes at least one of json service definition configuration information, or other suitable types of service definition configuration information. For example, service definitions 1108 may include information for using json objects through restful application programming interfaces to send and receive user data and content 839.

Figure 12:
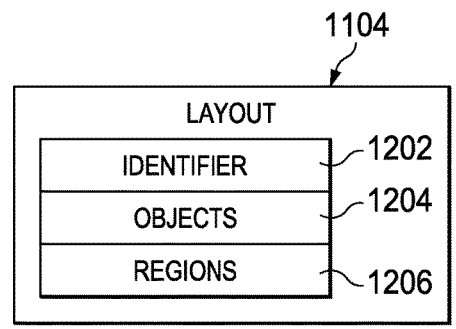
FIG. 12 is an illustration of a block diagram of a layout in accordance with an illustrative embodiment.

Turning next to FIG. 12, an illustration of a block diagram of a layout is depicted in accordance with an illustrative embodiment. In this illustration, an example of a number of components of layout 1104 in metadata 836 for web page 818 is shown.

In this illustrative example, layout 1104 includes identifier 1202, objects 1204, and regions 1206. Identifier 1202 is alphanumeric characters for layout 1104 used to identify layout 1104 in web page 818. Objects 1204 are a group of objects selected from objects 1000.

Regions 1206 are portions of web page 818 where objects 1204 are located. Regions 1206 include information describing locations of objects 1204 relative to each other in these portions of web page 818 when web page 818 is displayed.

Figure 13:
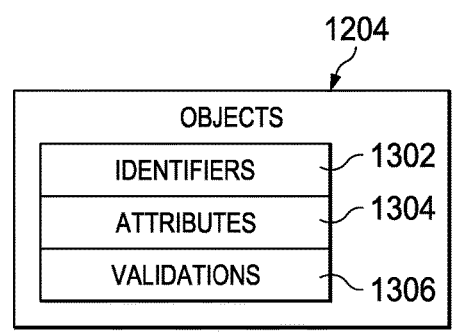
FIG. 13 is an illustration of a block diagram of objects in accordance with an illustrative embodiment.

Turning now to FIG. 13, an illustration of a block diagram of objects is depicted in accordance with an illustrative embodiment. In this illustration, an example of a number of components of objects 1204 in layout 1104 in metadata 836 for web page 818 is shown.

As depicted in this example, objects 1204 include identifiers 1302, attributes 1304, and validations 1306. Identifiers 1302 are names for objects 1204. These names may be used to identify one object from another in objects 1204.

Attributes 1304 are values for objects 1204 that define objects 1204. Attributes 1304 include at least one of display characteristics, content, default selections, or other suitable types of attributes for objects 1204.

In this illustrative example, validations 1306 are at least one of code that validates objects 1204 or options used by code to validate objects 1204. For example, when the object is a date, the validation code may verify that the date entered by an operator is valid.

Figure 14:
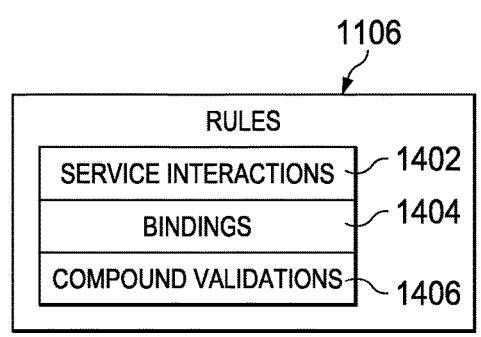
FIG. 14 is an illustration of a block diagram of rules in accordance with an illustrative embodiment.

With reference to FIG. 14, an illustration of a block diagram of rules is depicted in accordance with an illustrative embodiment. In this illustration, an example of a number of components of rules 1106 in metadata 836 for web page 818 is shown.

In this illustrative example, rules 1106 include service interactions 1402, bindings 1404, and compound validations 1406. Service interactions 1402 is code that performs actions based user input provided to objects 1204 specified in layout 1104 in metadata 836 for web page 818.

For example, service interactions 1402 for objects 1204 may include program code for generating an order form based on user input made to objects 1204. In this depicted example, the program code for generating the order form in service interactions 1402 is executed when user input made to objects 1204 on web page 818 is received. For example, the order form may be a json object that is generated by service interactions 1402.

As another example, service interactions 1402 for objects 1204 may include program code for calculating a value for an object in objects 1204 based on user input provided to objects 1204. In this example, the program code for calculating the value in service interactions 1402 is executed when user input to objects 1204 on web page 818 is received. For example, the value may be the output of an algorithm implemented by service interactions 1402 for web page 818 that processes user input made to objects 1204.

In this illustrative example, the program code for calculating the value may be a java script function. The following is an example of program code in service interactions 1402 that calculates tax for an object in objects 1204:

```
function calculateTax(salesPrice, taxRate) {
    return salesPrice * taxRate;
}
document[objectName].value =
    calculateTax(document[salesPriceInput].value,
        document[taxRateInput].value);
``` where "document" is a data structure that includes objects 1204, "salesPrice" and "taxRate" are parameters of the function "calculateTax", web page "salesPriceInput" and "taxRateInput" are examples of objects in objects 1204 in which user input is present, and "objectName" is an example of the object where the value calculated by the function "calculateTax" is placed on web page 818.

In this illustrative example, the function "calculateTax" is executed on at least one of client data processing systems 810, data processing system 822, or web page server 808. When data used by a function in service interactions 1402 is not provided to the function as a parameter of the function, the execution of the function may be restricted to a data processing system that has access to the data. For example, when a function in service interactions 1402 accesses the data structure "document," execution of the function may be restricted to the data processing system where "document" is present.

Bindings 1404 is code that links user input and content in objects 1204 to an application programming interface for sending and retrieving the user input and content. For example, a binding in bindings 1404 for a text box in web page 818 may include code that sends the text entered into the text box as a json object using a restful application programming interface.

Compound validations 1406 are codes that validate a group of objects 1204. For example, when web page 818 includes a group of name and address text boxes, a compound validation for the group of name and address text boxes may include code that validates the name and address entered.

Figure 15:
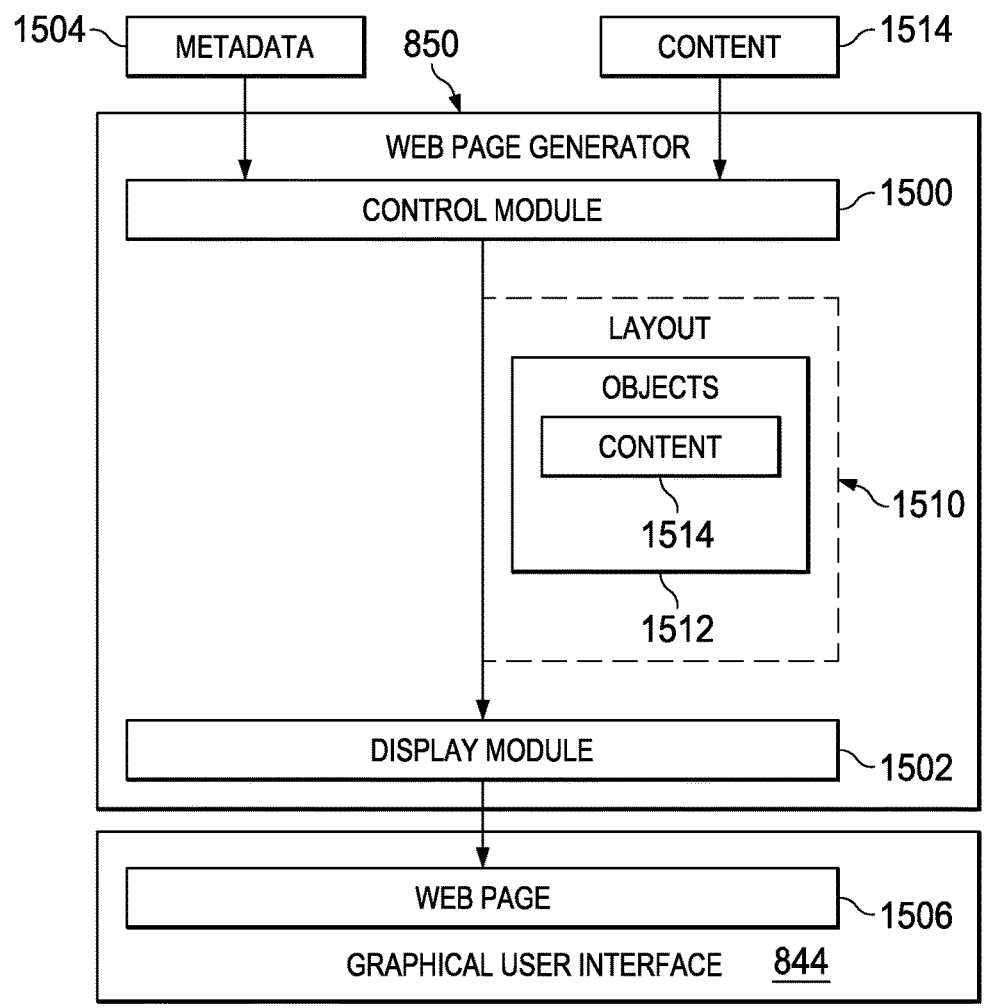
FIG. 15 is an illustration of a block diagram of data flow for creating and displaying web pages in accordance with an illustrative embodiment.

With reference now to FIG. 15, an illustration of a block diagram of data flow for creating and displaying web pages is depicted in accordance with an illustrative embodiment. In this depicted example, the data flow may be implemented in client data processing system 840 to display web pages 814. In this example, web pages 814 have been designed using web page designer 816 in data processing system 822. In this illustrative example, profiler 130, as depicted in FIGS. 1 and 2, may be used to identify times for processing web page 1506 for display. For example, profiler 130 may be part of web page 1506. Profiler 130 may be described in metadata 1504 in this example.

In this figure, an example of data flow for a process that generates and displays a web page in web pages 814 through web page generator 850 is shown. In this illustration, web page generator 850 is a program. For example, web page generator 850 may be implemented as a browser.

In this illustrative example, web page generator 850 includes control module 1500 and display module 1502. Control module 1500 receives metadata 1504 describing web page 1506. Metadata 1504 for web page 1506 is an example of metadata for a web page in metadata 836. Web page 1506 is an example of a web page in web pages 814 in FIG. 8.

Control module 1500 identifies layout 1510 for web page 1506 from metadata 1504. Layout 1510 specifies the layout of objects 1512 in web page 1506. Control module 1500 identifies objects 1512 from metadata 1504. Layout 1510 is an example of layout 1104 in FIG. 12. Objects 1512 are examples of objects 1204 in FIG. 13.

Control module 1500 identifies content 1514 needed for web page 1506 based on metadata 1504. Control module 1500 obtains content 1514 for web page 1506. For example, control module 1500 may obtain content 1514 from at least one of database 807 in FIG. 8 or some other suitable location where content 1514 is stored.

Control module 1500 places content 1514 into objects 1512 based on metadata 1504. For example, when an attribute in metadata for an object points to content, control module 1500 places the content into the object.

As depicted, display module 1502 receives layout 1510 from control module 1500. Display module 1502 creates web page 1506 using layout 1510. Display module 1502 displays web page 1506 on graphical user interface 844.

Figure 16:
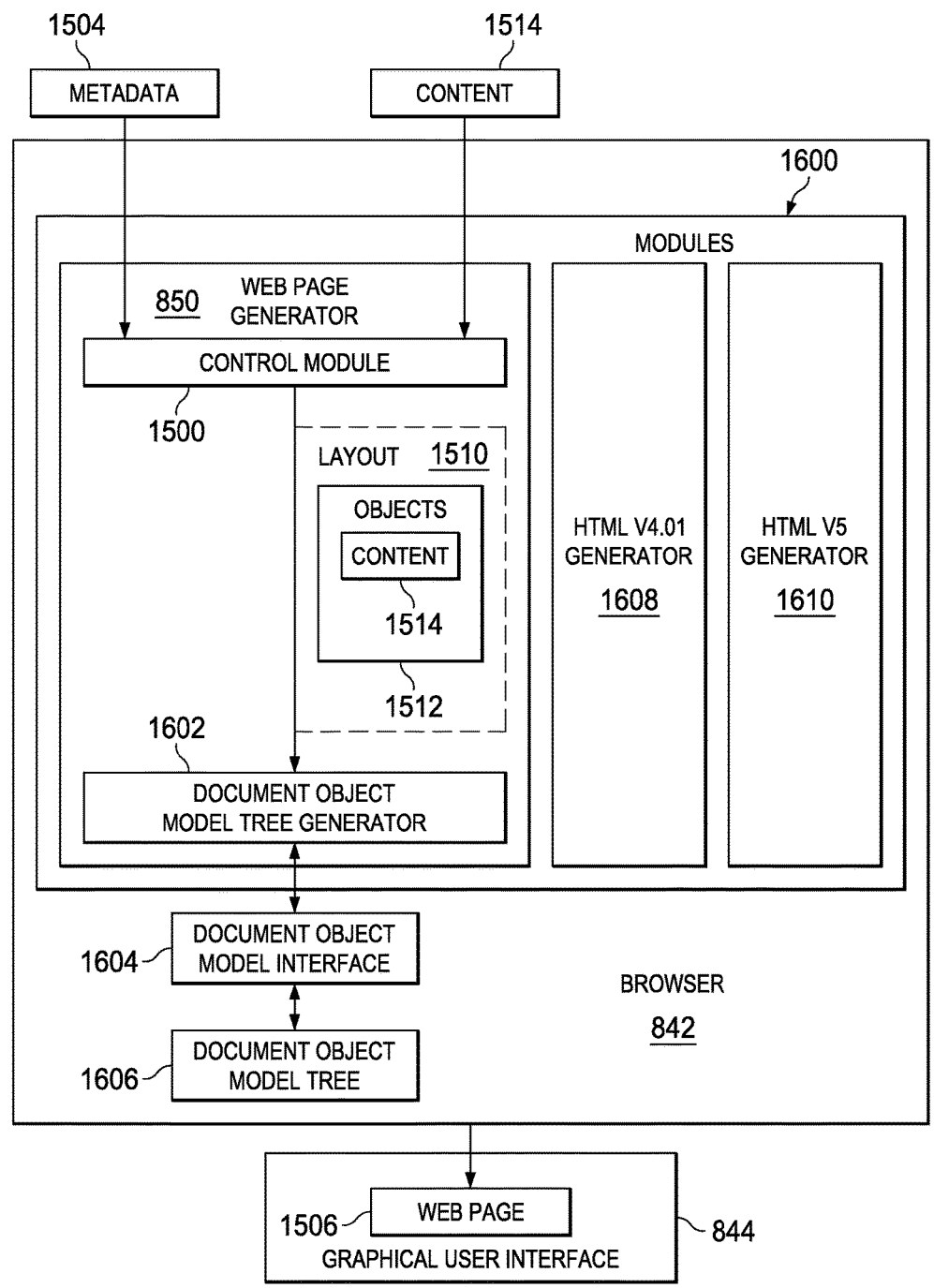
FIG. 16 is an illustration of another block diagram of data flow for creating and displaying web pages in accordance with an illustrative embodiment.

With reference now to FIG. 16, an illustration of another block diagram of data flow for creating and displaying web pages is depicted in accordance with an illustrative embodiment. In this illustration, the data flow may be implemented in browser 842 in client data processing system 840 to display web pages 814. Web pages 814 have been designed using web page designer 816 in data processing system 822 in this illustrative example.

In this figure, an example of data flow for a process that generates and displays a web page in web pages 814 through web page generator 850 is shown. In this illustration, web page generator 850 is a module in modules 1600 in browser 842.

In this illustrative example, web page generator 850 includes control module 1500 and document object model tree generator 1602. As described above in FIG. 15, control module 1500 identifies layout 1510 for objects 1512 from metadata 1504, obtains content 1514 for web page 1506, and places content 1514 in objects 1512.

As depicted, browser 842 includes document object model interface 1604. Document object model interface 1604 is an application programming interface in browser 842 for generating and accessing document object model trees. A document object model tree is a data structure that includes objects. These objects are examples of objects 834 in FIG. 8.

Document object model tree generator 1602 receives layout 1510 from control module 1500. Document object model tree generator 1602 uses document object model interface 1604 to generate document object model tree 1606 for web page 1506 from layout 1510.

Browser 842 generates web page 1506 from document object model tree 1606. In this illustrative example, browser 842 displays web page 1506.

In this illustrative example, modules 1600 include web page generator 850, hypertext markup language (HTML) version (v.) 4.01 generator 1608, and hypertext markup language version 5 generator 1610. As depicted, modules 1600 in browser 842 enable browser 842 to generate and display web pages based on metadata 1504, hypertext markup language version 4.01, and hypertext markup language version 5.

Web pages other than web pages 814 may be designed using different versions of hypertext markup language. Different web browsers implement support for these different versions of hypertext markup language. These web browsers have unique implementations for the versions of hypertext markup language. As a result, there are differences between the web browsers in how these other web pages look when displayed by the different web browsers.

Web pages 814 are designed using web page designer 816. Metadata 836 specifies what web pages 814 look like when displayed. Web pages 814 are generated and displayed by the web browsers using web page generator 850. Thus, no differences are present for what web pages 814 look like between the different web browsers when web pages 814 are displayed by the different web browsers.

The illustration of data flow for creating and displaying web pages shown in FIGS. 15-16 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, web page generator 850 may also store user data entered into web page 1506. In this example, when metadata 1504 includes a rule for storing the user data, web page generator 850 stores the user data based on the metadata for the rule.

As another example, metadata 1504 may be a first version of metadata 1504 received by web page generator 850. In this example, web page generator 850 may receive a second version of metadata 1504. Web page generator 850 may then generate web page 1506 a second time using the second version of metadata 1504 and content 1514. Web page generator 850 may display the web page generated the second time in graphical user interface 844.

As yet another example, control module 1500 may store metadata 1504 in a cache in client data processing system 840 when metadata 1504 is received. In this example, control module 1500 may also retrieve metadata 1504 from the cache in the client data processing system 840.

As a further example, control module 1500 may receive other metadata for an application instead of metadata 1504. In this example, the metadata for the application specifies web pages of the application. Control module 1500 identifies metadata 1504 from a portion of the metadata for a web page specified in the metadata for the application. In other words, the processes shown in FIG. 15 and FIG. 16 for creating and displaying web page 1506 can also be used to create and display web pages of applications. As still another example, the example of web page generator 850 in FIG. 16 as a module in modules 1600 in browser 842 may also be implemented as at least one of a plug-in for browser 842, an extension for browser 842, a part of browser 842, or in some other suitable manner.

Figure 17:
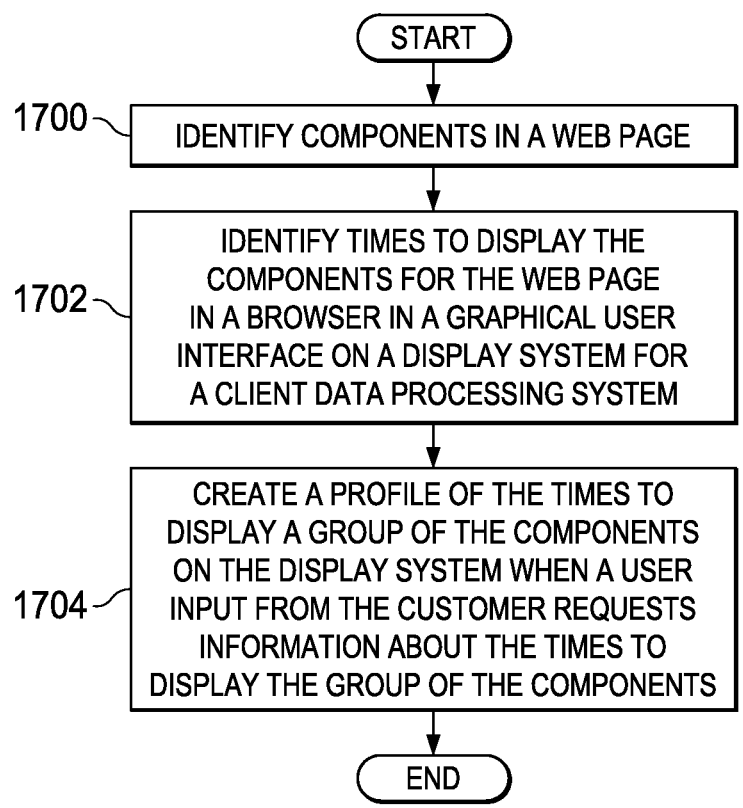
FIG. 17 is an illustration of a flowchart of a process for profiling a web page in accordance with an illustrative embodiment.

Turning next to FIG. 17, an illustration of a flowchart of a process for profiling a web page is depicted in accordance with an illustrative embodiment. The process illustrated in FIG. 17 may be implemented in web page environment 100 in FIG. 1. For example, the different steps illustrated may be implemented using profiler 130 in FIG. 1.

The process begins by identifying components in a web page (step 1700). The process identifies times to display the components for the web page in a browser in a graphical user interface on a display system for a client data processing system (step 1702).

As depicted, step 1702 is performed while the components are processed for display on the display system during use of the application by a customer. In step 1702, the times to display the components comprise times selected from at least one of the times to render the components at a client data processing system, the times to render the components at a server data processing system, the times to receive responses to requests made to services on the server data processing system, the times to transmit the components from the server data processing system to the client data processing system, the times to receive the components, or other times that are related to displaying the application.

In one example, identifying the times includes identifying first times to render the components on the display system and identifying second times for processing content when the content is requested for the web page, wherein the content is displayed in the web page on the display system. The first times may be times for displaying content such as images or graphics. The second times may be, for example, for processing text, a spreadsheet, data, or other content.

The content may be dynamically generated by at least one of a web server or the browser. For example, a second time may be for at least one of server-side scripting or server-side rendering.

The process creates a profile of the times to display a group of the components on the display system when a user input from the customer requests information about the times to display the group of the components (step 1704) with the process terminating thereafter. In step 1704, the profile of the times to display may be for a group of the components on the display system when the user input selects the group of components and requests information about the times to render the group of components.

As depicted in this example, identifying the times to display the components and creating the profile of the times to display components may be performed by a profiler that is implemented as a component that is selected from one of a browser, a plugin, an applet, a script, or program code run by a browser. Thus, the process in FIG. 17 enables identifying a corrective action that increases a speed at which the web page is displayed on a display system for a client data processing system. For example, the profile may be analyzed to identify which components take longer than desired to process for display. Based on this analysis, components taking longer than desired to display may be changed or replaced.

Figure 18:
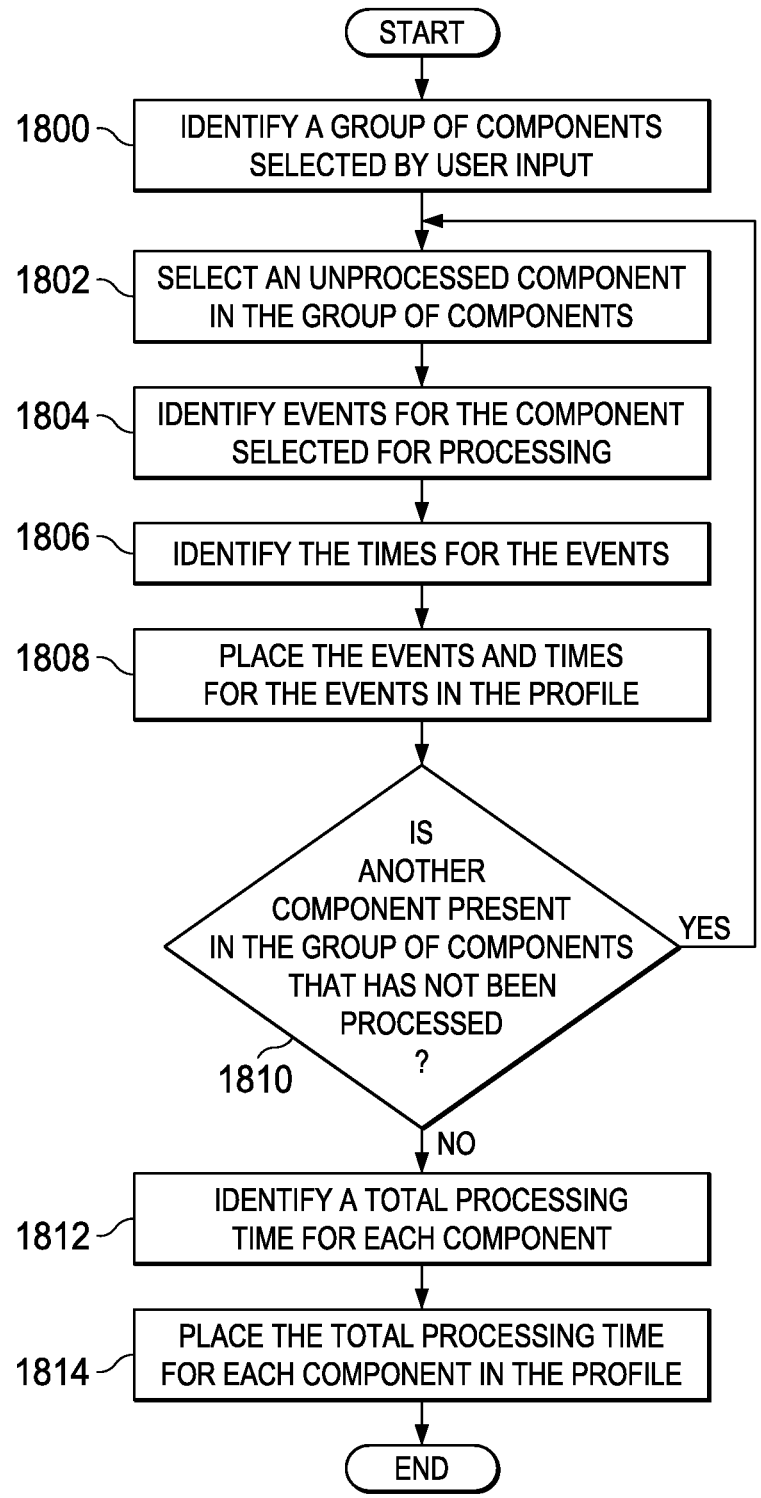
FIG. 18 is an illustration of a flowchart of a process for creating a profile in accordance with an illustrative embodiment.

With reference next to FIG. 18, an illustration of a flowchart of a process for creating a profile is depicted in accordance with an illustrative embodiment. The process illustrated in FIG. 18 is an example of one implementation for step 1704 in FIG. 17.

The process begins by identifying a group of components selected by user input (step 1800). For example, the user input may be the location of a pointer and the pressing of an ALT key and a click key. If the pointer is located over a single component, then that component including the components that make up that component is selected. In another example, if the pointer is located on a container containing several components, those components may be selected. In yet other illustrative examples, other types of user input may be used to select multiple components.

The process then selects an unprocessed component in the group of components (step 1802). The process identifies events for the component selected for processing (step 1804), and the process identifies the times for the events (set 1806). The process places the events and times for the events in the profile (set 1808).

A determination is made as to whether another component is present in the group of components that has not been processed (step 1810). If another component is present, the process returns to step 1802.

If another component is not present, the process identifies a total processing time for each component (step 1812). The process places the total processing time for each component in the profile (step 1814) with the process terminating thereafter.

Figure 19:
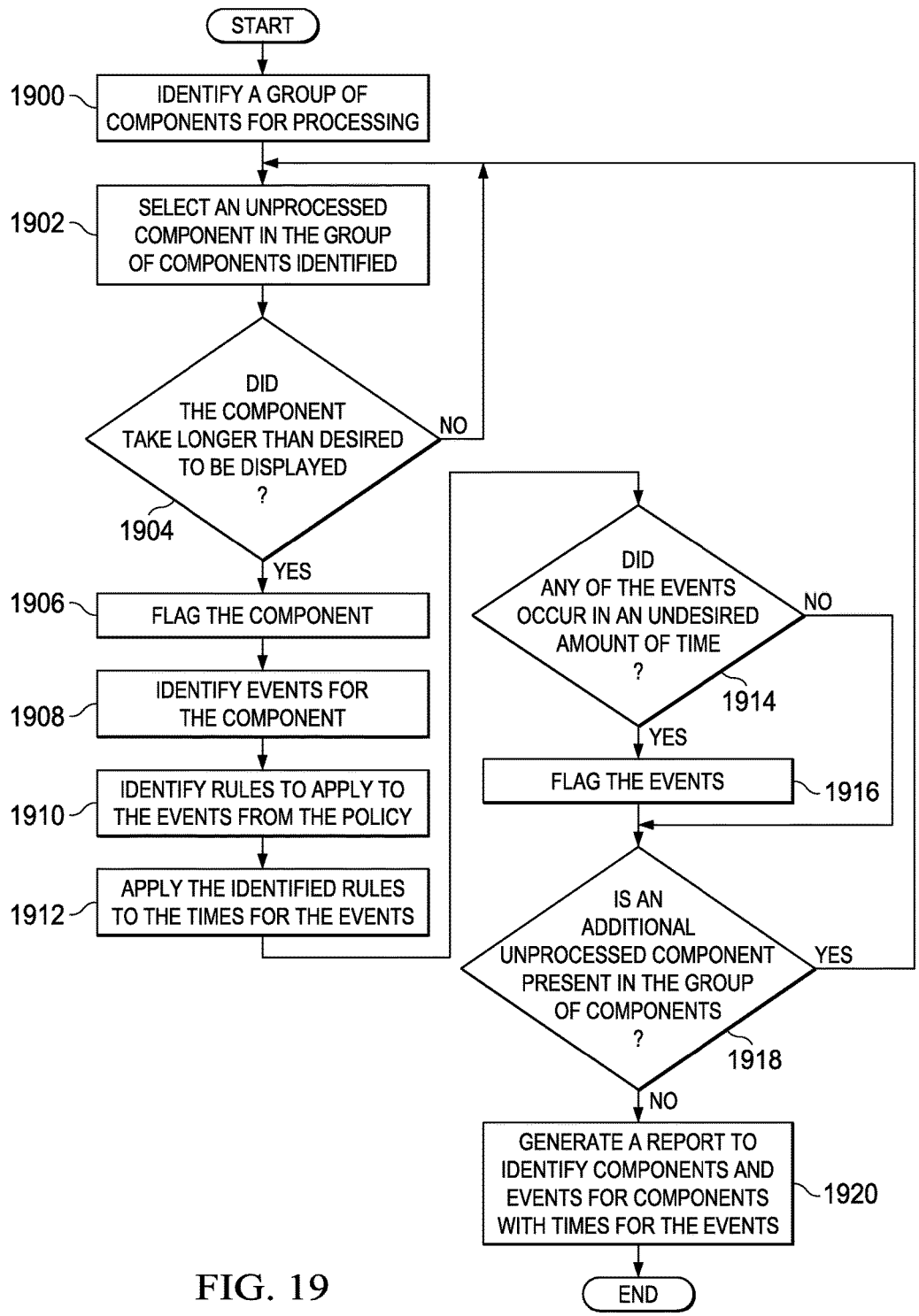
FIG. 19 is an illustration of a flowchart of a process for analyzing a profile in accordance with an illustrative embodiment.

With reference next to FIG. 19, an illustration of a flowchart of a process for analyzing a profile is depicted in accordance with an illustrative embodiment. The process illustrated in FIG. 19 may be implemented in at least one of web server 107 or side profiler 212 to identify corrective action 140. In this flowchart, the process applies a policy to the times for events that occur in displaying the group of components on the display system.

The policy identifies the components that have unacceptable display times. For example, the process identifies a component in the group of the components that has a time to display the component that is greater than desired. As depicted, the time may be for all events used to display the component or for a single event.

The process begins by identifying a group of components for processing (step 1900). The process selects an unprocessed component in the group of components identified (step 1902). The process determines whether the component took longer than desired to be displayed (step 1904). The determination in step 1904 may be made by applying a policy to the time taken to display the component.

If the component took longer than desired to be displayed, the process flags the component (step 1906). The process identifies events for the component (step 1908). The process identifies rules to apply to the events from the policy (set 1910). The process applies the identified rules to the times for the events (step 1912). A determination is made as to whether any of the events occurred in an undesired amount of time (step 1914). If any of the events occurred in an undesired amount of time, those events are flagged (step 1916).

A determination is made as to whether an additional unprocessed component is present in the group of components (set 1918). If another component is present, the process returns to step 1902. The process also returns to step 1902 from step 1904 if the component did not take longer than desired to display.

Otherwise, the process generates a report to identify components and events for components with times for the events (step 1920) with the process terminating thereafter. The report may be a document. In some illustrative examples, the report may be displayed in a window or in some other suitable manner. The flagged events allow for identification of events that had times that were longer than desired based on the application of the policy to the events.

With reference again to step 1914, if none of the events occurred in an undesired amount of time, the process proceeds to step 1918 as described above. Step 1918 is performed in this instance to determine whether additional components are present for processing.

Figure 20:
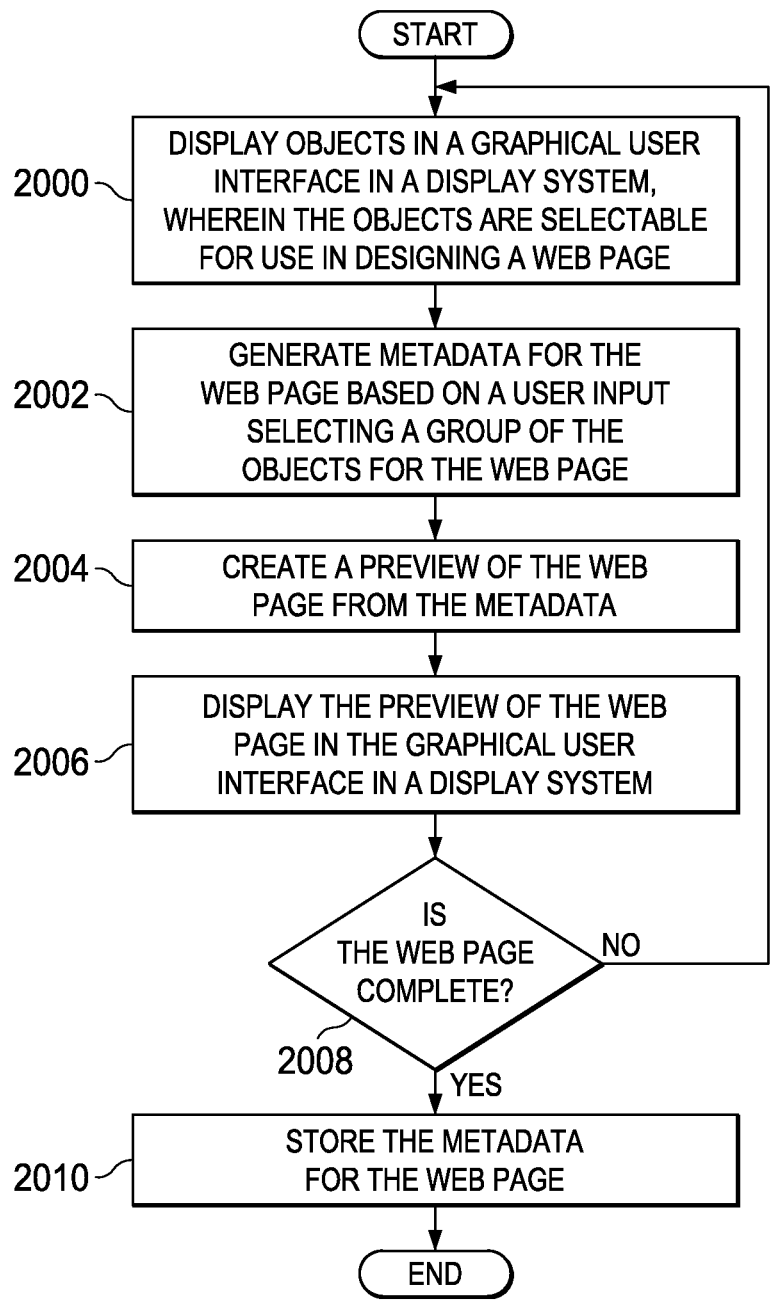
FIG. 20 is an illustration of a flowchart of a process for designing a web page in accordance with an illustrative embodiment.

Turning next to FIG. 20, an illustration of a flowchart of a process for designing a web page is depicted in accordance with an illustrative embodiment. The process illustrated in FIG. 20 may be implemented in information environment 800 shown in block form in FIG. 8. For example, the process may be implemented in web page designer 816 in information system 802.

The process begins by displaying objects in a graphical user interface in a display system, wherein the objects are selectable for use in designing a web page (step 2000). The process generates metadata for the web page based on a user input selecting a group of the objects for the web page (step 2002). The metadata describes the web page.

The process creates a preview of the web page from the metadata (step 2004). The process then displays the preview of the web page in the graphical user interface in a display system (2006).

A determination is made as to whether the web page is complete (step 2008). At this point, the web page may or may not be complete. For example, the preview may be only a portion of the web page as designed thus far.

If the web page is complete, the process stores the metadata for the web page (step 2010) with the process terminating thereafter. For example, the web page may be stored with web pages 814 for distribution by web page server 808. If the web page is not complete, the process returns to step 2000.

Figure 21:
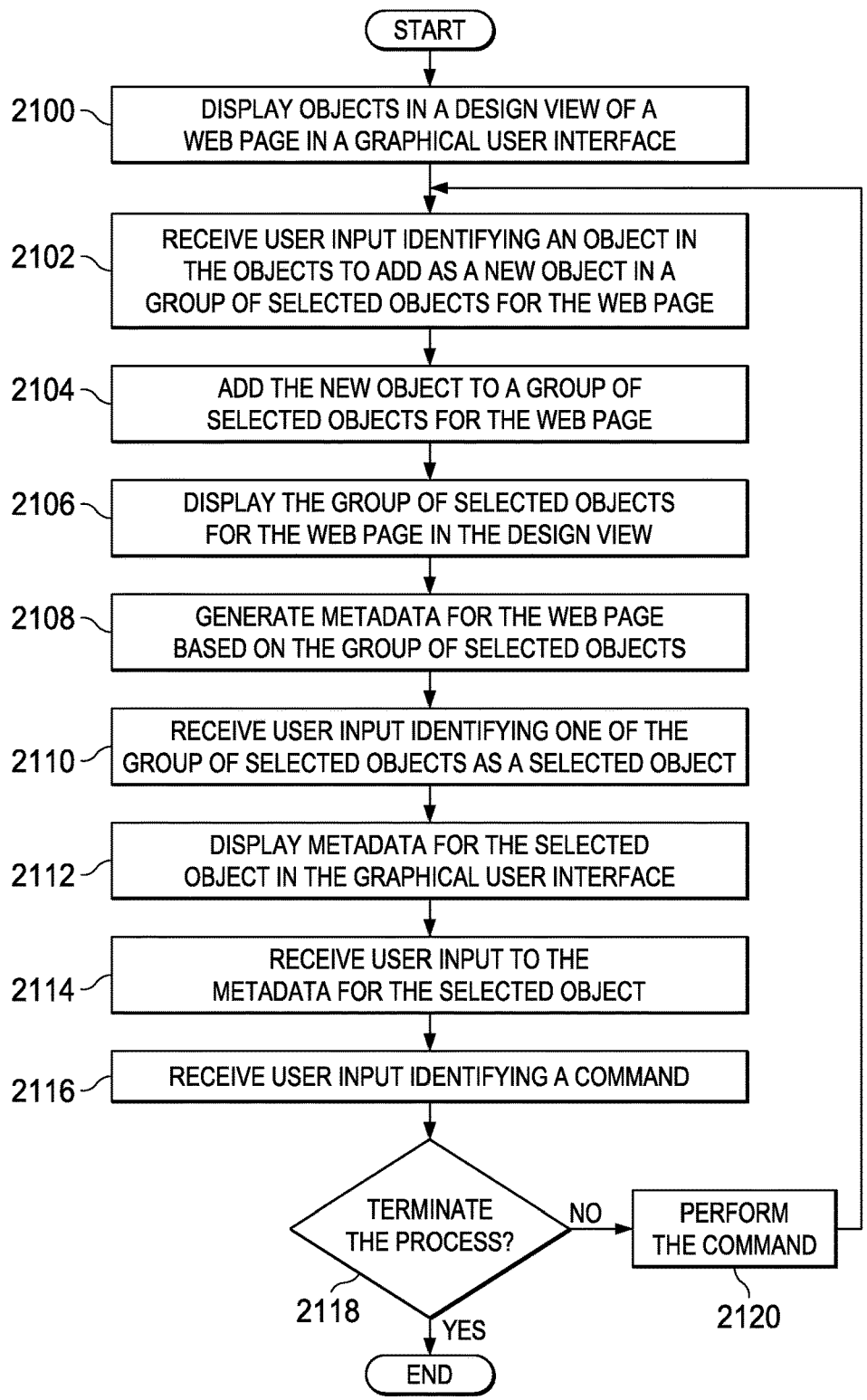
FIG. 21 is an illustration of a flowchart of a process for designing a web page in accordance with an illustrative embodiment.

Turning next to FIG. 21, an illustration of a flowchart of a process for designing a web page is depicted in accordance with an illustrative embodiment. The process illustrated in FIG. 21 may be implemented in information environment 800 shown in block form in FIG. 8 and FIG. 9. For example, the process may be implemented in web page designer 816 in information system 802 in FIG. 8 and the data flow shown in FIG. 9.

The process begins by displaying objects in a design view of a web page in a graphical user interface (step 2100). In step 2100, the design view may be displayed in a web page of a browser in the graphical user interface.

The process receives user input identifying an object in the objects to add as a new object in a group of selected objects for the web page (step 2102). The process adds the new object to a group of selected objects for the web page (step 2104). The process then displays the group of selected objects for the web page in the design view (step 2106).

The process generates metadata for the web page based on the group of selected objects (step 2108). The metadata describes the web page.

The process receives user input identifying one of the group of selected objects as a selected object (step 2110). The process then displays metadata for the selected object in the graphical user interface (step 2112). The process receives user input to the metadata for the selected object (step 2114). The user input to the metadata for the selected object at least one of creates or modifies the metadata for the selected object.

The process next receives user input identifying a command (step 2116). The command is at least one of retrieving the metadata for a web page, storing the metadata for the web page, generating a preview of the web page based on the metadata, generating a design view of the web page based on the metadata, or terminating the process.

A determination is made as to whether the command is to terminate the process (step 2118). If the command is to terminate the process, the process terminates. Otherwise, the process performs the command (step 2120) and returns to step 2102.

Figure 22:
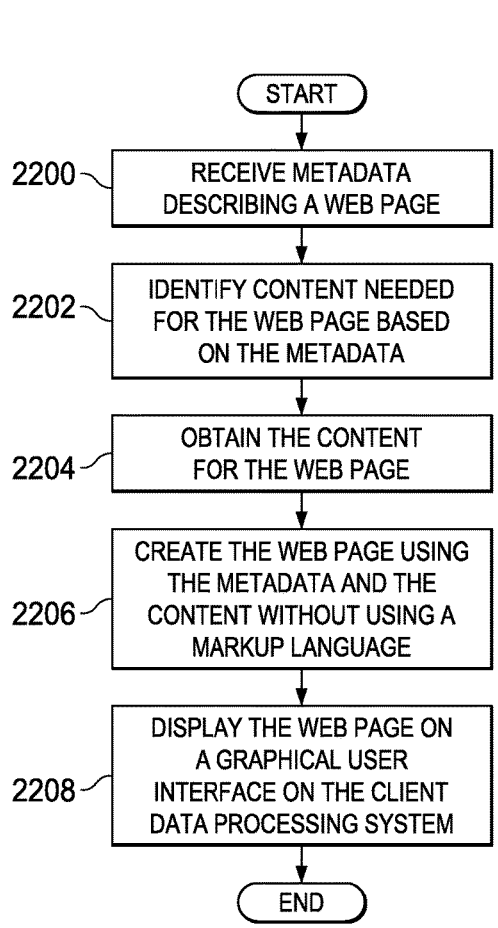
FIG. 22 is an illustration of a flowchart of a process for displaying a web page in accordance with an illustrative embodiment.

Turning next to FIG. 22, an illustration of a flowchart of a process for displaying a web page is depicted in accordance with an illustrative embodiment. The process illustrated in FIG. 22 may be implemented in information environment 800 shown in block form in FIG. 8. For example, the process may be implemented using web page generator 850 in client data processing system 840.

The process begins by receiving metadata describing a web page (step 2200). In this illustrative example, the metadata may be received from different sources. For example, the metadata may be received from a web page server, a local cache on the client data processing system, a proxy server, or some other suitable source. The metadata defines what the web page looks like without content for the web page.

The process identifies content needed for the web page based on the metadata (step 2202). The process then obtains the content for the web page (step 2204).

The process creates the web page using the metadata and the content without using a markup language (step 2206). The process displays the web page on a graphical user interface on the client data processing system (step 2208) with the process terminating thereafter.

Figure 23:
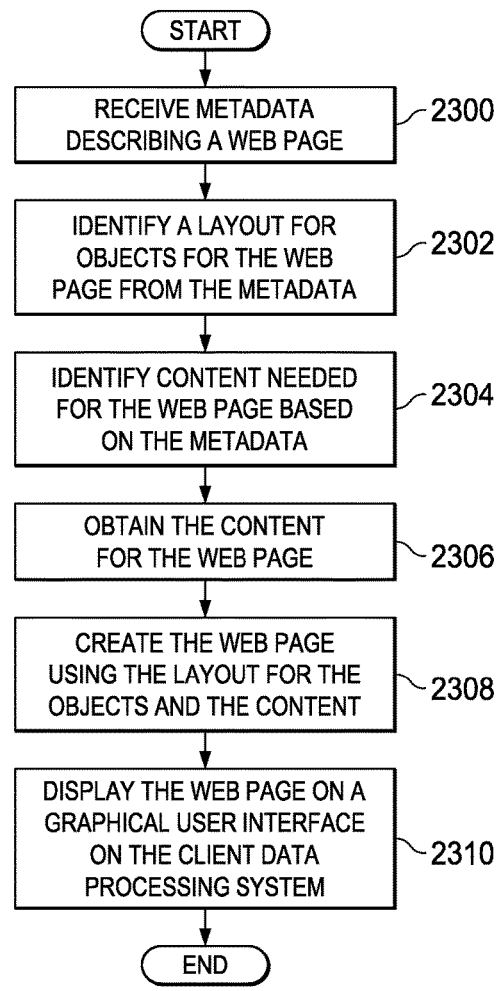
FIG. 23 is an illustration of a flowchart of a process for displaying a web page in accordance with an illustrative embodiment.

Turning next to FIG. 23, an illustration of a flowchart of a process for displaying a web page is depicted in accordance with an illustrative embodiment. The process illustrated in FIG. 23 may be implemented in information environment 800 shown in block form in FIG. 8. For example, the process may be implemented using web page generator 850 in client data processing system 840.

The process begins by receiving metadata describing a web page (step 2300). The process identifies a layout for objects for the web page from the metadata (step 2302). The web page is an example of web page 1306 and the metadata is an example of metadata 1504.

The process identifies content needed for the web page based on the metadata (step 2304). The process then obtains the content for the web page (step 2306).

The process creates the web page using the layout for the objects and the content (step 2308). The process displays the web page on a graphical user interface on the client data processing system (step 2310) with the process terminating thereafter.

As an example, in step 2308, the process may use web page generator 850 to generate document object model tree 1406 in browser 842. In this example, web page generator 850 uses document object model interface 1604 to generate document object model tree 1406 from the layout for the objects and the content. In this example, the process uses browser 842 to display the web page based on document object model tree 1406 in step 2310.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 19 applies a policy to the times. Instead, the process may create a report that lists the overall time to display the component and list the events in the times for the events for each component without applying a policy.

Figure 24:
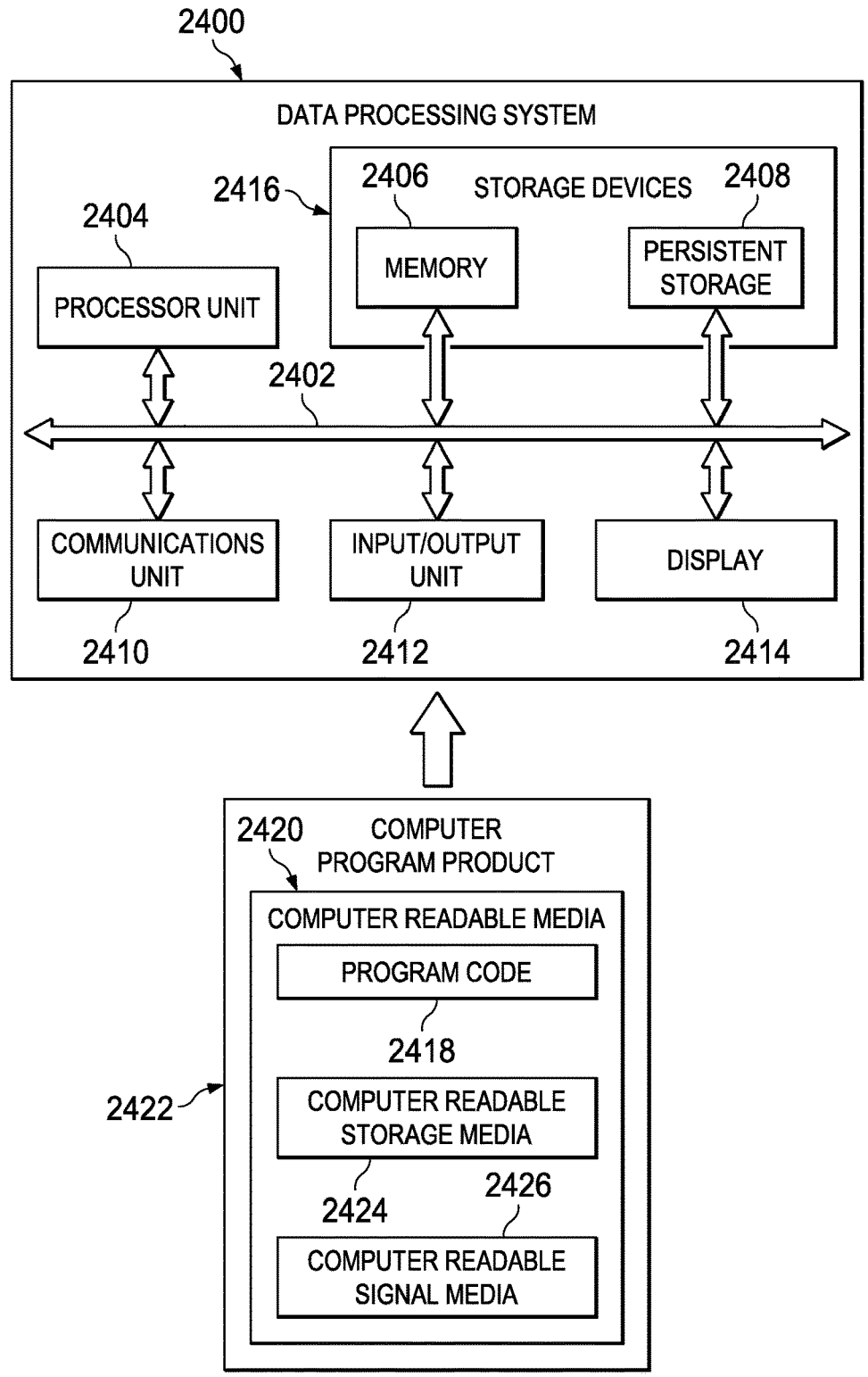
FIG. 24 is an illustration of a block diagram of a data processing system in accordance with an illustrative embodiment.

Turning now to FIG. 24, an illustration of a block diagram of a data processing system is depicted in accordance with an illustrative embodiment. Data processing system 2400 may be used to implement computer system 102. For example, client data processing system 104 and server data processing system 106 may be implemented using data processing system 2400. As another example, data processing system 822 and client data processing systems 810 may be implemented using data processing system 2400.

In this illustrative example, data processing system 2400 includes communications framework 2402, which provides communications between processor unit 2404, memory 2406, persistent storage 2408, communications unit 2410, input/output (I/O) unit 2412, and display 2414. In this example, communications framework 2402 may take the form of a bus system.

Processor unit 2404 serves to execute instructions for software that may be loaded into memory 2406. Processor unit 2404 may be a number of processors, a multi-processor core, or some other type of processor, depending on the particular implementation.

Memory 2406 and persistent storage 2408 are examples of storage devices 2416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2416 may also be referred to as computer readable storage devices in these illustrative examples. Memory 2406, in these examples, may be, for example, a random access memory or any other suitable volatile or non-volatile storage device. Persistent storage 2408 may take various forms, depending on the particular implementation.

For example, persistent storage 2408 may contain one or more components or devices. For example, persistent storage 2408 may be a hard drive, a flash memory, a rewritable optical disk, a rewritable magnetic tape, or some combination of the above. The media used by persistent storage 2408 also may be removable. For example, a removable hard drive may be used for persistent storage 2408.

Communications unit 2410, in these illustrative examples, provides for communications with other data processing systems or devices. In these illustrative examples, communications unit 2410 is a network interface card.

Input/output unit 2412 allows for input and output of data with other devices that may be connected to data processing system 2400. For example, input/output unit 2412 may provide a connection for user input through at least of a keyboard, a mouse, or some other suitable input device. Further, input/output unit 2412 may send output to a printer. Display 2414 provides a mechanism to display information to a user.

Instructions for at least one of the operating system, applications, or programs may be located in storage devices 2416, which are in communication with processor unit 2404 through communications framework 2402. The processes of the different embodiments may be performed by processor unit 2404 using computer-implemented instructions, which may be located in a memory, such as memory 2406.

These instructions are referred to as program code, computer usable program code, or computer readable program code that may be read and executed by a processor in processor unit 2404. The program code in the different embodiments may be embodied on different physical or computer readable storage media, such as memory 2406 or persistent storage 2408.

Program code 2418 is located in a functional form on computer readable media 2420 that is selectively removable and may be loaded onto or transferred to data processing system 2400 for execution by processor unit 2404. Program code 2418 and computer readable media 2420 form computer program product 2422 in these illustrative examples. In one example, computer readable media 2420 may be computer readable storage media 2424 or computer readable signal media 2426. In these illustrative examples, computer readable storage media 2424 is a physical or tangible storage device used to store program code 2418 rather than a medium that propagates or transmits program code 2418.

Alternatively, program code 2418 may be transferred to data processing system 2400 using computer readable signal media 2426. Computer readable signal media 2426 may be, for example, a propagated data signal containing program code 2418. For example, computer readable signal media 2426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2400 are not meant to provide architectural limitations to the manner in which different embodiments may be implemented. The different illustrative embodiments may be implemented in a data processing system including components in addition to or in place of those illustrated for data processing system 2400. Other components shown in FIG. 24 can be varied from the illustrative examples shown. The different embodiments may be implemented using any hardware device or system capable of running program code 2418.

Thus, the illustrative embodiments provide a method and apparatus for profiling a web page. In one illustrative example, the profiler is included as a component in the web page with the application. The profiler runs while the application in the web page is processed for display in the browser. The times for processing the components in the application occur during actual use of the web page. As a result, if the times to display the web page with the application are unsatisfactory, the operator, such as a customer, may select the group of the components for which information is desired.

The profiler creates a profile for the group of components. As a result, the time and effort in attempting to re-create the environment in which the unsatisfactory time for displaying the web page occurred may be avoided. This type of profiling enables identifying the corrective action that increases the speed at which the web page is displayed more easily as compared to currently used techniques. Further, the operator does not need to install the profiler which often may require commissions from administrator.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer system comprising:
    a display system for a client data processing system in the computer system; and
    a profiler located in a web page, wherein the profiler:
        identifies components for an application in the web page;
        identifies times for the client data processing system to obtain content for the web page;
        identifies times for the client data processing system to generate, without using a markup language, a document object model tree for the web page using metadata and the content, wherein the metadata includes an identifier that points to the web page, and a layout that defines what the web page looks like without the content by describing how a group of objects are arranged relative to each other in the web page;
        identifies times for the client data processing system to display the components for the application in the web page in a browser in a graphical user interface on the display system from the document object model tree; and
        creates a profile of the times to display the components on the display system when a user input from a customer requests information about the times to display the components;
    wherein the profiler enables identifying a corrective action that increases a speed at which the web page is displayed on the display system for the client data processing system.

2. The computer system of claim 1, wherein in creating the profile of the times to display the components on the display system when the user input requests the information about the times to display the components, the profiler creates the profile of the times to display a group of the components on the display system when the user input selects the group of the components and requests the information about the times to render the group of the components.

3. The computer system of claim 2, wherein the profiler applies a policy to the times to display the group of the components on the display, wherein the policy identifies the components that have unacceptable display times, and identifies a component in the group of the components that has a time to display the component that is greater than desired.

4. The computer system of claim 1, wherein the profile is a client-side profile, and wherein a server profiler creates a server-side profile of the times for events that occur on a server data processing system in response to processing requests from the browser.

5. A method for profiling a web page, the method comprising:
    identifying components in the web page;
    identifying times to display the components for the web page in a browser in a graphical user interface on a display system for a client data processing system while the components are processed for display on the display system during use of an application by a customer, wherein identifying the times to display the components comprises:
        identifying the times for the client data processing system to obtain content for the web page;
        identifying the times for the client data processing system to generate a document object model tree for the web page using metadata and the content without using a markup language; and
        identifying the times for the client data processing system to display the components for the application in the web page on the graphical user interface from the document object model tree, wherein the metadata describes the web page and defines what the web page looks like without the content for the web page; and
    creating a profile of the times to display a group of the components on the display system when a user input from the customer requests information about the times to display the group of the components, enabling identifying a corrective action that increases a speed at which the web page is displayed on the display system for the client data processing system.

6. The method of claim 5 further comprising:
    identifying the corrective action based on the times identified.

7. The method of claim 5, wherein the creating step comprises:
    creating the profile of the times to display the group of the components on the display system when the user input selects the group of the components and requests the information about the times to render the group of the components.

8. The method of claim 7 further comprising:
    applying a policy to the times to display the group of the components on the display, wherein the policy identifies the components that have unacceptable display times; and
    identifying a component in the group of the components that has a time to display the component that is greater than desired.

9. The method of claim 5, wherein the times to display the components comprise times selected from at least one of the times to render the components at the client data processing system, the times to render the components at a server data processing system, the times to receive responses to requests made to services on the server data processing system, the times to transmit the components from the server data processing system to the client data processing system, or the times to receive the components.

10. The method of claim 5, wherein identifying the times to display the components for the web page comprises:
identifying first times to render the components on the display system; and
identifying second times for processing content when the content is requested for the web page, wherein the content is displayed in the web page on the display system.

11. The method of claim 10, wherein the second times are the times for at least one of server-side scripting or server-side rendering.

12. The method of claim 5, wherein the components form an application.

13. The method of claim 12, wherein the method of profiling is performed during at least one of use of the application by the customer or development of the application.

14. The method of claim 5, wherein identifying the components in the web page; identifying the times to display the components; and creating the profile of the times to display the components is performed in a component that is selected from one of a browser, a plugin, an applet, a script, or program code run by the browser.

15. A computer system comprising:
a hardware processor;
a profiler, in communication with the hardware processor, wherein the profiler:
identifies components in a web page;
identifies times to display the components for the web page in a graphical user interface on a display system in a client data processing system while the components are processed for display on the display system during use of an application by a customer, wherein in identifying the times to display the components, the profiler identifies the times for the client data processing system to obtain the content for the web page; generate a document object model tree for the web page using metadata and the content without using a markup language; and display the components for the application in the web page on the graphical user interface from the document object model tree, wherein the metadata describes the web page and defines what the web page looks like without content for the web page; and
creates a profile of the times to display the components on the display system when a user input from the customer requests information about the times to render the components;
wherein the profiler enables identifying a corrective action that increases a speed at which the web page is displayed on the display system for the client data processing system.

16. The computer system of claim 15, wherein in creating the profile of the times to display the components on the display system when the user input requests the information about the times to display the components, the profiler creates the profile of the times to display a group of the components on the display system when the user input selects the group of the components and requests the information about the times to render the group of the components.

17. The computer system of claim 16, wherein the profiler applies a policy to the times to display the group of the components on the display, wherein the policy identifies the components that have unacceptable display times and identifies a component in the group of the components that has a time to display the component that is greater than desired.

18. The computer system of claim 15, wherein the times to display the components comprise the times selected from at least one of the times to render the components at a client data processing system, the times to render the components at a server data processing system, the times to receive responses to requests made to services on the server data processing system, the times to transmit the components from the server data processing system to the client data processing system, or the times to receive the components.

19. The computer system of claim 15, wherein in identifying the times to display the components for the web page, the profiler identifies first times to render the components on the display system; and identifies second times for processing the content when content is requested for the web page, wherein the content is displayed in the web page on the display system.

20. The computer system of claim 19, wherein the second times are the times for at least one of server-side scripting or server-side rendering.

21. The computer system of claim 15, wherein profiling is performed during at least one of use of the application by the customer or development of the application.

22. The computer system of claim 15, wherein the profiler is located in one of a browser, a plugin, an applet, a script, or program code run by a browser.

23. A computer program product for profiling a web page, the computer program product comprising:
a computer readable storage media;
first program code, stored on the computer readable storage media, for identifying components in the web page;
second program code, stored on the computer readable storage media, for identifying times to display the components for the web page in a graphical user interface on a display system in a client data processing system while the components are processed for display on the display system during use of an application by a customer, wherein the second program code comprises:
program code for identifying the times for the client data processing system to obtain content for the web page;
program code for identifying the times for the client data processing system to generate a document object model tree for the web page using metadata and the content without using a markup language; and
program code for identifying the times for the client data processing system to display the components for the application in the web page on the graphical user interface from the document object model tree, wherein the metadata describes the web page and defines what the web page looks like without the content for the web page; and
third program code, stored on the computer readable storage media, for creating a profile of the times to display the components on the display system when a user input from the customer requests information about the times to display the components, enabling identifying a corrective action that increases a speed at which the web page is displayed on the display system for the client data processing system.

24. The computer program product of claim 23 further comprising:
   fourth program code, stored on the computer readable storage media, for identifying the corrective action based on the times identified, enabling increasing the speed at which the web page is displayed on the display system on the client data processing system.

25. The computer program product of claim 23, wherein the third program code comprises:
   program code, stored on the computer readable storage media, for creating the profile of the times to display a group of the components on the display system when a user input selects the group of the components and requests the information about the times to render the group of the components.

26. The computer program product of claim 25 further comprising:
   fourth program code, stored on the computer readable storage media, for applying a policy to the times to display the group of the components on the display system, wherein the policy that identifies the components that have unacceptable display times; and
   fifth program code, stored on the computer readable storage media, for identifying a component in the group of the components that has a time to display the component that is greater than desired.

27. The computer program product of claim 23, wherein the times to display the components comprise times selected from at least one of the times to render the components at the client data processing system, the times to render the components at a server data processing system, the times to receive responses to requests made to services on the server data processing system, the times to transmit the components from the server data processing system to the client data processing system, or the times to receive the components.

28. The computer program product of claim 23, wherein the second program code comprises:
   program code, stored on the computer readable storage media, for identifying first times to render the components on the display system; and
   program code, stored on the computer readable storage media, for identifying second times for processing content when the content is requested for the web page, wherein the content is displayed in the web page on the display system.

29. The computer program product of claim 28, wherein the second times are the times for at least one of server-side scripting or server-side rendering.

* * * * *